US007130743B2

(12) United States Patent
Kudo et al.

(10) Patent No.: US 7,130,743 B2
(45) Date of Patent: Oct. 31, 2006

(54) INFORMATION PROVIDING METHOD AND INFORMATION PROVIDING DEVICE

(75) Inventors: Takahiro Kudo, Katano (JP); Jun Ozawa, Nara (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 170 days.

(21) Appl. No.: 10/474,459

(22) PCT Filed: Aug. 5, 2002

(86) PCT No.: PCT/JP02/07957

§ 371 (c)(1),
(2), (4) Date: Oct. 8, 2003

(87) PCT Pub. No.: WO03/014670

PCT Pub. Date: Feb. 20, 2003

(65) Prior Publication Data

US 2004/0128066 A1    Jul. 1, 2004

(30) Foreign Application Priority Data

Aug. 6, 2001 (JP) ............................. 2001-237500
Feb. 25, 2002 (JP) ............................. 2002-047438

(51) Int. Cl.
*G01C 21/34* (2006.01)
*G08G 1/123* (2006.01)
*G06F 7/00* (2006.01)
(52) U.S. Cl. ................. 701/209; 701/211; 340/995.14; 340/995.19
(58) Field of Classification Search ............... 701/204, 701/209, 211, 200, 208, 207; 340/995.22, 340/995.18, 995.17, 992, 995.14, 995.19
See application file for complete search history.

(56) References Cited

U.S. PATENT DOCUMENTS

| 5,790,974 | A  | * | 8/1998  | Tognazzini ............. 455/456.5 |
| 5,912,635 | A  |   | 6/1999  | Oshizawa et al. |
| 5,919,246 | A  | * | 7/1999  | Waizmann et al. ......... 701/209 |
| 5,938,721 | A  | * | 8/1999  | Dussell et al. ............. 701/211 |
| 6,317,685 | B1 | * | 11/2001 | Kozak et al. ............... 701/210 |
| 6,591,188 | B1 | * | 7/2003  | Ohler ......................... 701/209 |
| 6,629,034 | B1 | * | 9/2003  | Kozak et al. ............... 701/200 |
| 6,678,613 | B1 | * | 1/2004  | Andrews et al. ........... 701/213 |
| 6,941,222 | B1 | * | 9/2005  | Yano et al. ................. 701/209 |

FOREIGN PATENT DOCUMENTS

| EP | 1003018    | 5/2000  |
| JP | 08-271272  | 10/1996 |
| JP | 09-119842  | 5/1997  |
| JP | 10-180461  | 6/1998  |

(Continued)

*Primary Examiner*—Thomas Black
*Assistant Examiner*—Christine M. Behncke
(74) *Attorney, Agent, or Firm*—McDermott Will & Emery LLP

(57) ABSTRACT

In a car navigation system (1), a position information detection means (11) detects position information on a vehicle using, for example, a GPS. A travel information history of the vehicle obtained based on the detected position information is accumulated in a travel information history means (15). When detecting an event such as start of an engine, an action prediction means (17) predicts a destination of the vehicle by referring to a route to the current time and to the accumulated travel information history. Commercial or traffic information regarding the predicted destination is acquired by an information acquisition means (18) from a server (2), and then is displayed on a screen, for example, by an information provision means (19).

2 Claims, 31 Drawing Sheets

FOREIGN PATENT DOCUMENTS

| | | |
|---|---|---|
| JP | 11-153446 | 6/1999 |
| JP | 11-230778 | 8/1999 |
| JP | 2000-113387 | 4/2000 |
| JP | 2000-258177 | 9/2000 |
| JP | 2000-258178 | 9/2000 |
| JP | 2000-266562 | 9/2000 |
| JP | 2001-188985 A | 7/2001 |
| JP | 2001-201352 | 7/2001 |

\* cited by examiner

FIG.2

| NODE NUMBER | TYPE | EAST LONGITUDE | NORTH LATITUDE |
|---|---|---|---|
| N1 | INTERSECTION | 135° 20' 35" | 34° 44' 35" |
| N2 | INTERSECTION | 135° 24' 35" | 34° 44' 86" |
| N3 | INTERSECTION | 135° 22' 06" | 34° 44' 78" |
| N4 | INTERSECTION | 135° 22' 10" | 34° 45' 60" |
| N5 | INTERSECTION | 135° 22' 20" | 34° 46' 79" |
| N6 | INTERSECTION | 135° 20' 42" | 34° 46' 70" |
| N7 | INTERSECTION | 135° 22' 35" | 34° 47' 35" |
| . . | . . | . . | . . |
| N123 | LANDMARK (HOME) | 135° 19' 48" | 34° 42' 38" |
| N124 | LANDMARK (OFFICE) | 135° 30' 22" | 34° 12' 23" |
| . . | | . . | . . |
| N427 | AREA (UMEDA KITA) | 135° 29' 51" | 34° 41' 57" |
| N428 | | 135° 46' 18" | 34° 44' 30" |

| NODE NUMBER | DATE AND TIME |
|---|---|
| DEPARTURE PLACE | |
| N6 | JULY 31, 8:05 |
| N8 | JULY 31, 8:06 |
| N12 | JULY 31, 8:08 |
| N9 | JULY 31, 8:09 |
| N34 | JULY 31, 8:11 |
| · · | · · |
| N128 | JULY 31, 8:53 |
| DESTINATION | |

| NODE NUMBER | DATE AND TIME |
|---|---|
| DEPARTURE PLACE | |
| N128 | JULY 31, 12:25 |
| N140 | JULY 31, 12:29 |
| N125 | JULY 31, 12:36 |
| · · | · · |
| N68 | JULY 31, 13:33 |
| DESTINATION | |

(b)

| NODE NUMBER | DATE AND TIME |
|---|---|
| HOME | |
| DEPARTURE PLACE | |
| N6 | JULY 31, 8:05 |
| N8 | JULY 31, 8:06 |
| N12 | JULY 31, 8:10 |
| DESTINATION | |
| DEPARTURE PLACE | |
| N12 | JULY 31, 13:40 |
| N34 | JULY 31, 13:50 |
| · · | · · |
| N6 | JULY 31, 21:20 |
| DESTINATION | |
| HOME | |

FIG.7

| POSITION | NAME | INFORMATION |
|---|---|---|
| 135° 22'<br>34° 47' | SATO SHOP | ALL PRODUCTS 20% OFF TODAY |
| 138° 14'<br>35° 7' | FAMILY PLAZA | GRAB BAG PRESENT FOR CHILDREN |
| 133° 82'<br>37° 30' | YAMANAKA C.C | LADIES DAY, SPECIAL FAVOR FOR WOMEN |
| ... | ... | ... |

| POSITION | NAME | URL |
|---|---|---|
| 135° 22'<br>34° 47' | SATO<br>SHOP | http://www.sato.com/topic.html |
| 138° 14'<br>35° 7' | FAMILY<br>PLAZA | http://www.fami-pla.co.jp/index.html |
| 133° 82'<br>37° 30' | YAMANAKA<br>C.C | http://www.yamanakaCC.co.jp/special.html |
| ... | ... | ... |

| USER ID | NODE NUMBER | TIME |
|---|---|---|
| 2 | N6 | JULY 31, 8:05 |
| 2 | N8 | JULY 31, 8:06 |
| 2 | N12 | JULY 31, 8:08 |
| 2 | N9 | JULY 31, 8:09 |
| . | . | . |
| . | . | . |
| . | . | . |
| 2 | N6 | JULY 31, 8:11 |
| 4 | N6 | JULY 31, 8:30 |
| 4 | N8 | JULY 31, 8:31 |
| 4 | N28 | JULY 31, 8:33 |
| . | . | . |
| . | . | . |
| . | . | . |

| POSITION | NAME | FREQUENCY |
|---|---|---|
| 135° 22'<br>34° 47' | SATO SHOP | 25 |
| 138° 14'<br>35° 7' | FAMILY PLAZA | 64 |
| 133° 82'<br>37° 30' | YAMANAKA C.C | 6 |
| 133° 82'<br>37° 30' | YET TO BE SET | 5 |

| TIME | SCHEDULE |
|---|---|
| 10:00 | MEETING AT HOME OFFICE |
| 12:00 | |
| 14:00 | OBSERVE LABORATORY |
| 16:00 | |
| 18:00 | GO HOME |
| | |

| DATE | DEPARTURE TIME | DEPARTURE PLACE | ROUTE | DESTINATION |
|---|---|---|---|---|
| 02/05/07(Tue) | 08:12 | HOME | N12,N7,N23,N24,····· | △△ CO., LTD. |
| 02/05/07(Tue) | 19:23 | △△ CO., LTD. | N54,N3,N39,N24,····· | HOME |
| 02/05/08(Wed) | 09:30 | HOME | N12,N7,N18,N4,····· | ○○SUPERMARKET |
| ····· | ····· | ····· | ····· | ····· |
| 02/05/26(Sun) | 10:05 | HOME | N12,N8,N20,N49,····· | SEASIDE PARK |
| 02/05/26(Sun) | 17:57 | SEASIDE PARK | N127,N96,N82,N79,····· | HOME |

| DEPARTURE DATE OF THE WEEK GROUP | DEPARTURE TIME GROUP | DEPARTURE PLACE | ROUTE | DESTINATION | AVERAGE REQIRED TIME | FREQUENCY |
|---|---|---|---|---|---|---|
| WEEKDAY | MORNING (8:00–11:00) | HOME | N12,N7,N23,N24,⋯ | △△CO., LTD | 60 MIN. | 70% |
| | | | ⋯⋯ | O×CLINIC | 20 MIN. | 25% |
| | | | N12,N7,N18,N4,⋯ | OO SUPERMARKET | 15 MIN. | 5% |
| | DAYTIME (12:00–16:00) | O×CLINIC | ⋯⋯ | HOME | 15 MIN. | 80% |
| | | OO SUPER-MARKET | ⋯⋯ | OO SUPERMARKET | 10 MIN. | 20% |
| | | | ⋯⋯ | HOME | 15 MIN. | 100% |
| | EVENING (17:00–22:00) | △△CO., LTD | N54,N3,N39,N24,⋯ | HOME | 45 MIN. | 97% |
| | | | ⋯⋯ | OO SUPERMARKET | 35 MIN. | 3% |
| DAY OFF | MORNING (8:00–11:00) | HOME | N12,N7,N18,N4,⋯ | OO SUPERMARKET | 15 MIN. | 50% |
| | | | N12,N8,N20,N49,⋯ | SEASIDE PARK | 80 MIN. | 30% |
| | | | ⋯⋯ | RENTAL VIDEO SHOP | 10 MIN. | 20% |
| | ⋯⋯ | ⋯⋯ | ⋯⋯ | ⋯⋯ | ⋯⋯ | ⋯⋯ |
| | ⋯⋯ | ⋯⋯ | ⋯⋯ | ⋯⋯ | ⋯⋯ | ⋯⋯ |

FIG.23

| DESTINATION | ESTIMATED ARRIVAL TIME | TRAFFIC INFORMATION |
|---|---|---|
| △△CO., LTD | 10:30 | T INTERSECTION TO R INTERSECTION 15 MIN. |
| ○×CLINIC | 09:30 | NO TRAFFIC JAM INFORMATION |

FIG.28

| NAME | POSITION | INFORMATION | EFFECTIVE PERIOD | |
|---|---|---|---|---|
| | | | START | END |
| CHILDREN PLAZA | NODE A | SOUVENIRS ARE PRESENTED TO VISITORS | JUNE 1, 9:00 | JUNE 2, 15:00 |
| GS UMEDA | NODE B | FEMALE DRIVER, GASOLINE 3 YEN OFF | MAY 28, 8:00 | JUNE 3, 17:00 |
| ... | ... | ... | ... | ... |

FIG.31

| POSSIBLE AREA | CORRESPONDING NODE |
|---|---|
| AREA1 | NODE2, NODE3, NODE5, NODE6 |
| AREA2 | NODE25, NODE28, NODE30, NODE32 |
| AREA3 | NODE52, NODE53, NODE68, NODE71 |
| . . | . . |

INFORMATION PROVIDING METHOD AND INFORMATION PROVIDING DEVICE

TECHNICAL FIELD

The present invention relates to a technology for providing users with information by using information equipment capable of detecting position information such as car navigation systems and personal digital assistants (PDAs).

BACKGROUND ART

In recent years, it has become possible to detect position information with car navigation systems, PDAs or cellular phones by utilizing, for example, antennas for global positioning systems (GPSs) or cellular phone networks. Accordingly, various services have been provided by utilizing this position detection function.

The car navigation systems offer a service of displaying information on the neighborhood of a user's vehicle captured with a GPS through FM multiplex telecasting or light beacons. With respect to the cellular phones, offered are services such as "i-area" provided by NTT DoCoMo, Inc. or "J-SKY" provided by J-PHONE Co., Ltd. Each of the services pinpoints the area where a user of a cellular phone is located within the range from several hundreds meters to several kilometers and provides the user with event information or service information regarding this area.

In addition, terminals which are cellular phones including GPS units have been put on the market, so that the position can be detected with an error of about several meters in an area where the precision is high. Various services regarding such position information are expected to become available in the future.

Problems to be Solved

Various services now available identify the current position of (an information terminal used by) a user and provide the user with information regarding the current position. It is expected in the future that there arises the need for provision of information regarding a place for which the user is heading as well as information regarding the current position of the user.

In systems such as currently-used car navigation systems, a user can specify a destination or a route clearly, so that a mechanism for providing the user with information regarding the specified destination or route can be easily attained. However, in fact, the operation of searching for a destination or a route is complicated. In addition, it is considered that if such operation performed by the driver during the drive will cause momentary lapses of attention and thus obstruct careful driving.

In view of this, achievement of such a technology that enables provision of information regarding a destination of a user accurately without special operation by the user will allow the user to drive more comfortably and safely than now.

Therefore, an object of the present invention is to enable accurate provision of information regarding the destination of the user without requiring the user to perform complicated operation.

DISCLOSURE OF INVENTION

In order to solve the problems, an inventive method for providing information to an occupant of a vehicle includes the steps of: detecting position information on the vehicle with information equipment installed in the vehicle; accumulating, as a travel information history, routes of the vehicle obtained from the detected position information; predicting a destination of the vehicle by referring to a route along which the vehicle has traveled to the current time and to the accumulated travel information history, when detecting the occurrence of a given event; and providing information regarding the predicted destination to the occupant via the information equipment.

According to the present invention, when the occurrence of a given event is detected, a destination of a vehicle is predicted by referring to a route along which the vehicle has traveled to the current time and a travel information history as accumulated past travel routes. Then, information on the predicted destination is provided to an occupant of the vehicle via information equipment installed in the vehicle. Accordingly, the vehicle occupant can receive useful information regarding his/her destination appropriately without special operation and also can travel by the vehicle comfortably and safely.

In the inventive information providing method, the given event is preferably a given action of the occupant.

In the inventive information providing method, the travel information history is preferably accumulated in the manner of transition among nodes. In addition, at least one of the nodes is preferably a landmark, an area or an intersection. Alternatively, the inventive method preferably includes the step of defining, as a node, an intersection which is located on the routes and through which the vehicle has passed in at least two directions. Alternatively, the inventive method preferably includes the step of defining an area including a plurality of nodes satisfying a given requirement.

In the inventive information providing method, in the predicting step, a destination to which estimated required travel time exceeds a predetermined value is preferably eliminated from being a predicted destination.

The inventive information providing method preferably includes the step of identifying the occupant of the vehicle, the travel information history is preferably accumulated for every occupant, and the predicting step is preferably performed by referring to the travel information history accumulated for the occupant identified at the occurrence of the given event.

The inventive information providing method preferably includes the step of accumulating preference information regarding a place which the occupant of the vehicle prefers and the frequency with which the occupant visited the place, and the predicting step and the information providing step are preferably performed in consideration of the accumulated preference information. In addition, a place where the vehicle made a stop for at least a predetermined time period is preferably determined to be the place which the occupant of the vehicle prefers.

The inventive information providing method preferably includes the step of accessing a scheduler to acquire a schedule of the occupant, and the predicting step is preferably performed in consideration of the acquired schedule.

The inventive information providing method preferably includes the steps of: accessing a scheduler to acquire a schedule of the occupant; and providing, when the predicted destination of the vehicle deviates from that in the acquired schedule, the occupant with a message indicating the deviation.

The inventive information providing method preferably includes the step of calculating estimated required time or estimated arrival time with respect to the predicted destination, and in the information providing step, the estimated required time of estimated arrival time that has been calculated is preferably provided to the occupant.

In this case, the inventive information providing method preferably includes the step of acquiring traffic information regarding a route to the predicted destination, and the estimated required time or estimated arrival time is preferably calculated by referring to the acquired traffic information.

Alternatively, the inventive information providing method preferably includes the steps of: accessing a scheduler to acquire a schedule of the occupant; and comparing the estimated required time or estimated arrival time that has been calculated with the schedule of the occupant, thereby detecting at least one of the presence or absence of idle time and the presence or absence of a possibility of being late. In such a case, when the presence of idle time is detected, information for suggesting how to spend the idle time is preferably provided to the occupant, in the information providing step. Otherwise, when the presence of a possibility of being late is detected, information on another route for shortening required time is preferably provided to the occupant, in the information providing step.

Alternatively, the inventive information providing method preferably further includes the steps of: acquiring commercial information regarding the predicted destination; and filtering the acquired commercial information by referring to the estimated required time or estimated arrival time that has been calculated, and in the information providing step, the filtered commercial information is preferably provided to the occupant.

Another inventive method for providing information to an occupant of a vehicle includes the steps of: detecting position information on the vehicle with information equipment installed in the vehicle; predicting a destination of the vehicle by referring to a route which is obtained from the detected position information and along which the vehicle has traveled to the current time and to a travel information history in which routes along which the vehicle traveled in the past are accumulated, when detecting the occurrence of a given event; and providing information regarding the predicted destination to the occupant via the information equipment.

An inventive method for providing information to a person traveling includes the steps of: detecting position information on the person with information equipment held by the person; accumulating, as a travel information history, routes of the person obtained from the detected position information; predicting a destination of the person by referring to a route along which the person has traveled to the current time and to the accumulated travel information history, when detecting the occurrence of a given event; and providing information regarding the predicted destination to the person via the information equipment.

An inventive system installed in a vehicle and used for providing information to an occupant of the vehicle includes: means for detecting position information on the vehicle; means for accumulating, as a travel information history, routes of the vehicle obtained from the detected position information; means for predicting a destination of the vehicle by referring to a route along which the vehicle has traveled to the current time and to the accumulated travel information history, when the occurrence of a given event is detected; and means for providing information regarding the predicted destination to the occupant.

An inventive system held by a person and used for providing information to the person includes: means for detecting position information on the person; means for accumulating, as a travel information history, routes of the person obtained from the detected position information; means for predicting a destination of the person by referring to a route along which the person has traveled to the current time and to the accumulated travel information history, when the occurrence of a given event is detected; and means for providing information regarding the predicted destination to the person.

BRIEF DESCRIPTION OF DRAWINGS

FIG. 2 shows an example of data stored in a map database.

FIG. 4 shows examples of the accumulated history of travel information in the first embodiment of the present invention.

FIG. 7 shows an example of position-related information stored.

FIG. 8 shows relationship between position information and URL addresses for providing information related to the position information.

FIG. 11 shows an example of accumulated history of travel information in the second embodiment of the present invention.

FIG. 13 is an example of preference information in the third embodiment of the present invention.

FIG. 16 is an example of a schedule of a user controlled by a scheduler.

FIG. 20 shows an example of the accumulated history of travel information in the fifth embodiment of the present invention.

FIG. 21 is an example of a travel pattern detected from the travel information history shown in FIG. 20.

FIG. 23 shows an example of information for notifying a user of estimated arrival time.

FIG. 28 shows examples of commercial information acquired.

FIG. 31 shows an example of information indicating possible areas.

BEST MODE FOR CARRYING OUT THE INVENTION

Hereinafter, embodiments of the present invention will be described with reference to the drawings.

It should be noted that in the following embodiments, descriptions will be given on the assumption of a case where a user receives information while driving a vehicle equipped with a car navigation system. However, the present invention is not limited to the case of car navigation systems and can be achieved by utilizing information equipment such as PDAs or cellular phones capable of acquiring position information.

In the following embodiments, the ideas of "landmark" and "area" will be used. The "landmark" indicates facilities, stores or buildings such as stations, department stores, tourist destinations, entertainment places, houses or offices. The "area" indicates an area including a plurality of landmarks (e.g., "Kobe Shigaichi" and "Kansai Gakken Toshi").

Embodiment 1

A first embodiment of the present invention relates to a system for predicting a destination of a user based on a stored action pattern of the user and providing the user with information regarding the predicted destination.

Figure 1:
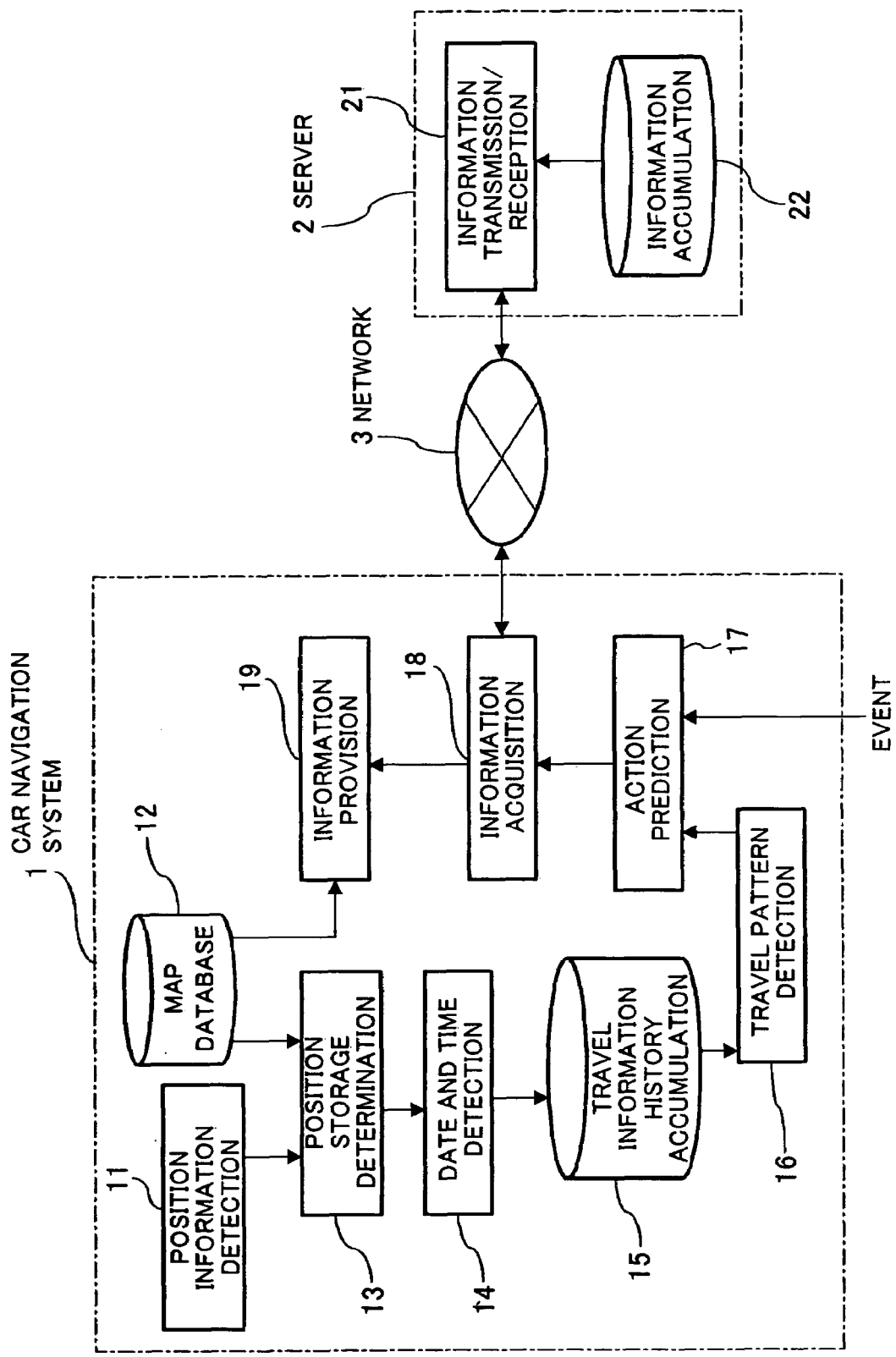
FIG. 1 is a diagram showing a configuration of the whole of a system according to a first embodiment of the present invention.

FIG. 1 is a diagram showing a configuration of the whole of a system according to this embodiment. In FIG. 1, reference numeral 1 denotes a car navigation system installed in a vehicle in which the user rides in, reference numeral 2 denotes a server for providing information in response to a request from the car navigation system 1, and reference numeral 3 denotes a network, e.g., the internet, for connecting the car navigation system 1 and the server 2. In this case, the user as a vehicle occupant may be or may not be a driver.

In the car navigation system 1, reference numeral 11 denotes a position information detection means for detecting information regarding the current position of the user's vehicle by using a GPS, for example, and reference numeral 12 denotes a map database for storing map information. Reference numeral 13 denotes a position storage determination means for determining whether or not the detected current position is to be stored (whether or not the detected current position is a node, which will be described later) by referring to the current position detected by the position information detection means 11 and to the map database 12, reference numeral 14 denotes a date and time detection means for detecting the current date and time, and reference numeral 15 denotes a travel information history accumulation means for chronologically storing, in pairs, the current position and the current date and time detected by the date and time detection means 14 when the position storage determination means 13 determines that the current position should be stored. Reference numeral 16 denotes a travel pattern detection means for detecting a chronological travel pattern based on information on the position and the date and time (travel information) stored in the travel information history accumulation means 15, and reference numeral 17 denotes an action prediction means for predicting a destination of the user's vehicle based on the travel pattern detected by the travel pattern detection means 16. Reference numeral 18 denotes an information acquisition means for acquiring information regarding the destination of the user predicted by the action prediction means 17 from the server 2 via the network 3, and reference numeral 19 denotes an information provision means for displaying, to the user, the information acquired by the information acquisition means 18 and the map information stored in the map database 12 on a liquid crystal display, for example.

With respect to the server 2, reference numeral 21 denotes an information transmission/reception means for transmitting/receiving information to/from the car navigation system 1, and reference numeral 22 denotes an information accumulation means for storing information to be transmitted to the car navigation system 1.

FIG. 2 is a table showing an example of data stored in the map database 12 and partly excerpted from the data to be used as a reference in this embodiment. In this embodiment, intersections, landmarks and the names of areas, for example, are indicated by the idea of "node". In FIG. 2, node numbers have ID numbers allocated to the respective nodes and are stored together with information on the types of nodes and information on latitude and longitude. The latitude and longitude information is position information on representative points of the respective nodes, and there exists information representing the range (e.g., a radius from each of the representative points) in accordance with the types of the nodes, i.e., intersections, landmarks and areas. For example, in the case of intersections or landmarks, the range is set at a radius of 10 m of a representative point. In the case of areas, the range is set at a radius of 1 km of a representative point. Of course, the range may differ depending on areas.

In addition to proper names such as "ABC intersection" or "DEF amusement park", places specific to the user such as "user's house" and "office" represented by the nodes numbers N123 and N124 can be registered as nodes.

Instead of using ID numbers, the names of intersections, landmarks and areas may be identified by the respective nodes. That is to say, it is sufficient to identify intersections, landmarks, areas, and so on, on the route stored in the travel information history accumulation means 15.

In this embodiment, information on the nodes is controlled in the map database 12 provided in the car navigation system 1. Alternatively, information on the node ID numbers, for example, may be stored in the server 2 so that when receiving position information such as latitude and longitude from the car navigation system 1, the server 2 notifies the car navigation system 1 of the associated node ID number.

Figure 3:
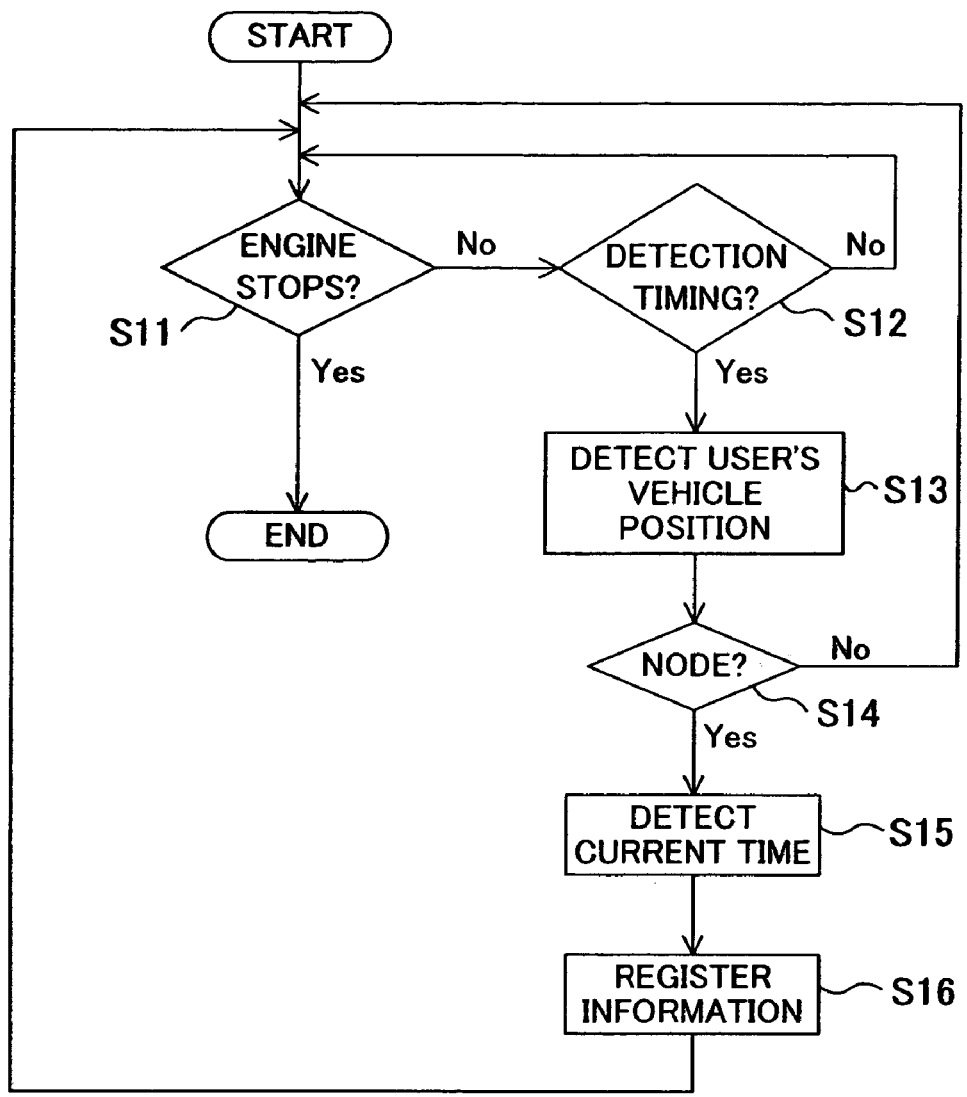
FIG. 3 is a flowchart showing a process of accumulating a history of travel information in the first embodiment of the present invention.

Now, the flow of a process in which routes of a vehicle are accumulated in the travel information history accumulation means 15 as a travel information history will be described with reference to a flowchart shown in FIG. 3.

First, in the car navigation system 1, the position information detection means 11 determines whether or not the engine of the vehicle is running (S11). When the engine is running (No at S11) the position information detection means 11 determines whether or not it is timing of detecting the current position of the vehicle (S12). This determination is performed by determining whether or not a predetermined time period, e.g., three seconds, has elapsed after the previous detection.

When it is determined to be the timing of detection (Yes at S12), the position information detection means 11 detects the position information (latitude and longitude) on the user's vehicle by using, for example, a GPS (S13). Then, the position storage determination means 13 refers to data stored in the map database 12 as shown in FIG. 2 based on the detected position information and determines whether or not the current position is contained in one of the nodes (S14). When it is determined that the current position is contained in one of the nodes (Yes at S14), the date and time detection means 14 detects the current date and time (S15). On the other hand, when it is determined that the current position is not contained in any of the nodes (No at S14), the process returns to S11 and the determination is performed again.

When the current date and time is detected at step S15, the number of a node corresponding to the place where the vehicle is currently located, and the current date and time are stored in the travel information history accumulation means 15 (S16). Thereafter, the process returns to step S11, and it is determined whether or not the engine is running again.

FIG. 4 shows examples of a travel information history accumulated in the travel information history accumulation means 15. As shown in FIG. 4, the node numbers and the passage date and time are chronologically stored in pairs. For example, it is represented that the vehicle passed through a node N6 at 8:05 on July 31, a node N8 at 8:06 on the same day, and then a node N12 at 8:08 on the same day.

In an example shown in FIG. 4(a), travel information is divided into segments each from a departure place to a destination, i.e., is segmented into parts each from start of the engine (i.e., departure place) to stop of the engine (i.e., destination). On the other hand, in an example shown in FIG. 4(b), segments each "from departure from the user's house to return to the user's house" are accumulated. Alternatively, segments each having "the same date" may be accumulated or travel information may be accumulated without being segmented.

In this embodiment, the time is represented by month, day, hour and minute. Alternatively, units such as year, second and day of the week may also be stored, or one of these units may be selected and stored.

In addition, the time at which the engine is started or the time at which the engine is stopped may also be stored. Further, in addition to storage of the start time and stop time of the engine, only the node number of a node through which the vehicle passed may be stored without storing the passage time of the node.

Now, it will be described how the travel pattern detection means 16 operates. The travel pattern detection means 16 extracts a tendency in traveling of the user's vehicle from a travel information history as shown in FIG. 4 accumulated in the travel information history accumulation means 15. In this case, the tendency in traveling refers to a rule such as "if the vehicle travels along the route including the nodes N6, N8, N12 and N9 between 8 a.m. and 11 a.m., the vehicle is likely to head for a node N34 next".

Now, everyday action of a person will be considered. The pattern of the everyday action of a person does not change so much depending on the day. For example, there seem to be tendencies as follows. Those who use cars for commuting, they probably travel from home to the office in the morning and travel from the office to home in the evening on weekdays. In addition, if the driver is a father, he is likely to head for the office but if the driver is a mother, she is likely to go to a supermarket. That is to say, if position information on the place where the user is currently located and travel information until the current time are grasped, it is considered to be possible to predict the future action of the user to some extent.

The tendency in traveling can be extracted in the following manner. The entire travel information history accumulated in the travel information history accumulation means 15 is searched so as to find data representing the route including the nodes N6, N8, N12 and N9 along which the vehicle traveled between 8 a.m. and 11 a.m., and then node numbers after traveling along the route are extracted together with the frequencies thereof. For example, if the vehicle travels to the node N34 seventeen times, a node N18 twice and a node N17 once, after passing through the route including the nodes N6, N8, N12 and N9, the probabilities of traveling to the nodes N34, N18 and N17 are represented by the following posterior probabilities:

$P(N34|R)=17/20$ $P(N18|R)=2/20$ $P(N17|R)=1/20$ where the event in which the vehicle traveled along the route including the nodes N6, N8, N12 and N9 is R. As the value of the probability for a node increases, the probability that the user's vehicle will head for the node after the event R increases.

In this embodiment, the node N9 corresponding to the current position and the previous three nodes N6, N8 and N12 are used for reference. However, reference nodes are not limited to this number and may vary in number. That is to say, the number of the nodes may be appropriately set in accordance with the accumulated data structure. For example, if the travel information is made by accumulating segments each "from a departure place to a destination", a series of nodes from the node at the departure to the node at the current time are used for reference. Alternatively, the node representing the place at which the user made a stop just before the current time such as a landmark or an area and the current node may be referred to. Moreover, all the nodes representing landmarks or areas at which the use made a stop after departure from the user's house and the current node may be referred to.

In addition, the following technique may be used. In general, as the number of reference nodes increases, the accuracy in prediction increases because requirements become more rigid, whereas the amount of data which can be extracted from the accumulated travel information history decreases. As a result, from a statistical viewpoint, there is a possibility that data sufficient for the prediction cannot be obtained. In view of this, the number of reference nodes is increased by using previous nodes starting from the current node in reverse chronological order, and a series of nodes with the maximum length satisfying the requirement that the amount of data exceeds a predetermined value is determined as the reference nodes. The previous nodes to be used may include nodes of all the types, or may be limited to nodes of a type representing any one of landmarks, areas and intersections or a type representing a combination thereof By using such a technique, it is possible to make the requirements rigid with the maximum number of reference nodes, while satisfying the amount of data necessary for prediction in terms of statistics. As a result, the accuracy in prediction can be enhanced.

Figure 5:
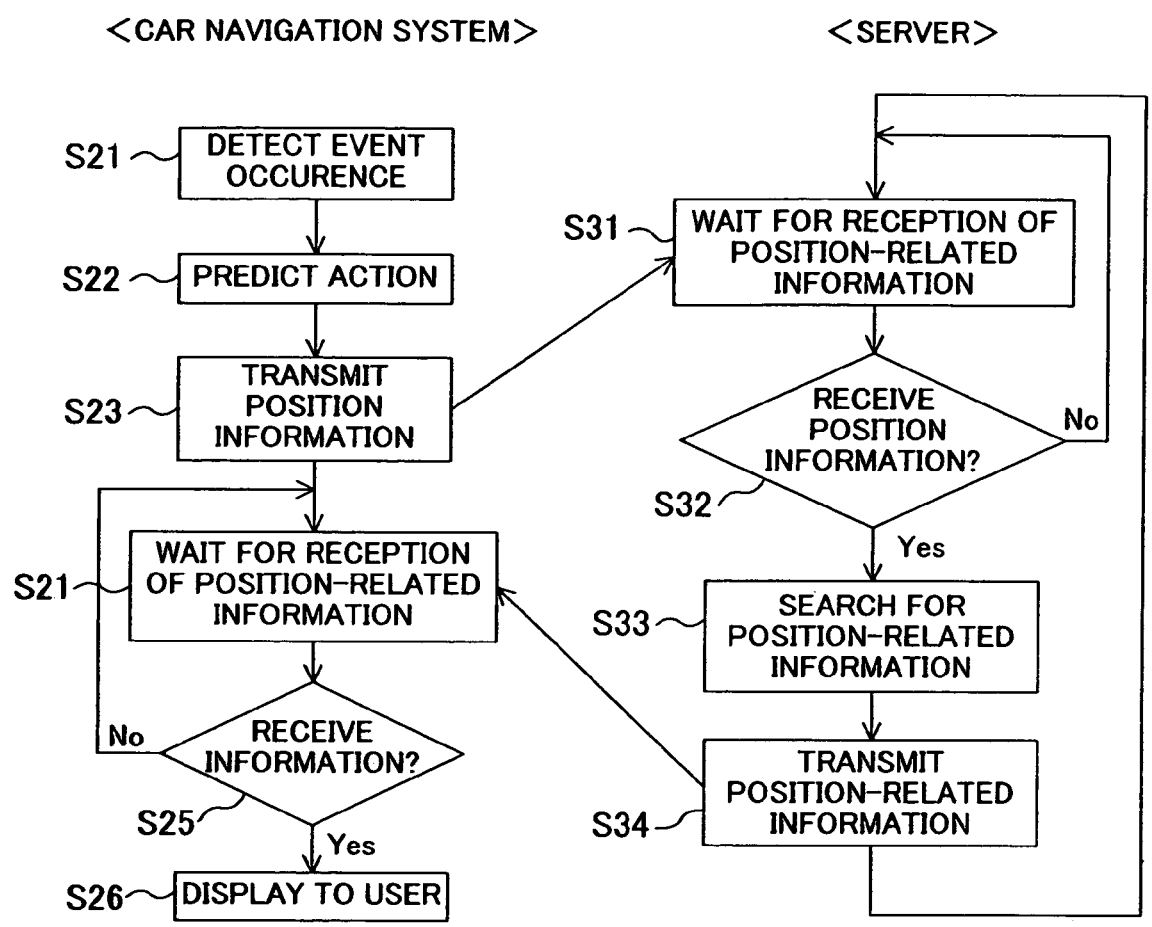
FIG. 5 is a flowchart showing a process of action prediction and information provision in the first embodiment of the present invention.

Now, action prediction on the user's vehicle and a process for providing the user with information according to the action prediction will be described with reference to a flowchart shown in FIG. 5.

When the occurrence of a given event is detected (S21), the action prediction means 17 predicts future actions of the user's vehicle after the current time by referring to the travel pattern detection means 16 (S22). The operation of the travel pattern detection means 16 described above may be performed beforehand or may be performed when the given event is detected.

Examples of the given event include start of an engine and operation of a car navigation system (e.g., the operation of requesting information provision) as given actions of an occupant of the vehicle. The examples also include passing through an intersection (or after the passage), departure and arrival from/at a landmark or an area, regular timing such as a predetermined time interval, and acquisition of new information.

Figure 6:
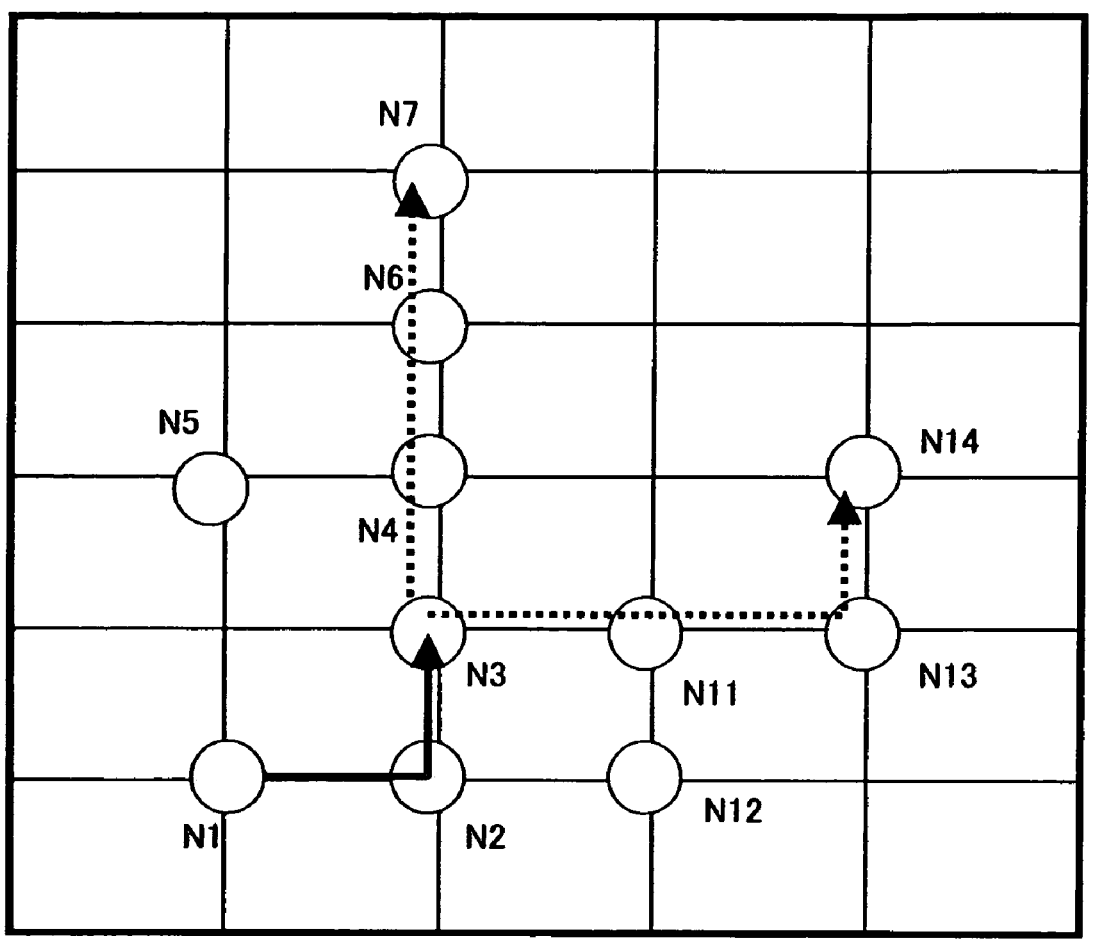
FIG. 6 is a diagram showing an example of node transition.

Now, a method for predicting the action will be described. Suppose that the user's vehicle runs along a route including the nodes N1, N2 and N3 and is now at the node N3 in FIG. 6. If the route including the nodes N1, N2 and N3 is represented by the event R, the posterior probabilities that the vehicle will head for nodes N4 and N11 after passing through the node N3 are represented by P(N4|R) and P(N11|R), respectively, by referring to the travel information history accumulated in the travel information history accumulation means 15. Since such posterior probabilities are provided to respective nodes, the probabilities that the vehicle will head for nodes N7 and N14 are represented, as products of the posterior probabilities, by the following equations:

$$P(N7)=P(N4|R)*P(N6|R \wedge N4)*P(N7|R \wedge N4 \wedge N6)$$

$$P(N14)=P(N11|R)*P(N13|R \wedge N11)*P(N14|R \wedge N11 \wedge N13)$$

The action prediction means 17 selects a node whose probability value satisfies a given requirement as a destination to be predicted. The given requirement means that the probability value exceeds a threshold value $\alpha$ indicating certainty of the prediction. For example, providing that, between P(N7) and P(N14), it is P(N7) that exceeds the threshold value $\alpha$, the action prediction means 17 selects the node N7 as a direction in which the user's vehicle will run.

In this embodiment, the probabilities are calculated with respect to the nodes N7 and N14. Alternatively, the action prediction means 17 may calculate the probabilities of the current node and all the nodes subsequent to the current node, for example. The action prediction means 17 may also calculate the products of posterior probabilities until the node whose product is less than or equal to the threshold value $\alpha$ is found, may calculate nodes through which the user passed in the past, or may calculate only nodes representing landmarks and areas.

In the case where there is no node whose posterior probability in the route information to the current time exceeds the threshold value $\alpha$, the probabilities of nodes may be calculated every time the vehicle passes through the nodes after the current node, and prediction on the direction may be started when a node whose probability exceeds the threshold value $\alpha$ is found.

In addition, the car navigation system 1 may be previously notified of nodes corresponding to tourist facilities, entertainment places, stores and the like whose information is suggested to be provided to the user or of nodes corresponding to intersections near the nodes so that the action prediction means 17 calculates the probabilities with respect to routes to these nodes. Of course, the car navigation system 1 may be previously notified of position information such as latitude and longitude so that mapping is performed on the latitude and longitude and the node IDs by referring to the map database 12 in the car navigation system 1.

When the action prediction means 17 predicts that the user's vehicle is heading for, for example, the node N7 with any of the above-described methods, the information acquisition means 18 transmits position information on the predicted node N7 to the server 2 via the network 3 (S23). FIG. 2 shows that, as position information, the node N7 is at 135 degrees 22 minutes 35 seconds east longitude and 34 degree 47 minutes 35 seconds north latitude. When it is confirmed that the information transmission/reception means 21 in the server 2 receives the position information from the car navigation system 1 (S31, S32), information accumulated in the information accumulation means 22 is searched so as to find information regarding the received position information (S33).

FIG. 7 shows an example of position-related information stored in the information accumulation means 22. As shown in FIG. 7, the names and positions of information providers and information that the providers want to provide are accumulated in the information accumulation means 22. Then, information provided by an information provider close to the position indicated by the position information transmitted from the car navigation system 1 is selected as position-related information. The determination whether or not the provider is close to the position indicated by the transmitted position information is made based on whether or not this position is included in a circle with its center at the position of the provider and with a given radius (e.g., 400 m). Alternatively, the determination whether or not the provider is close to the position indicated by the transmitted position information may be performed, based on whether or not this position is included in a range represented as a rectangle in which the information provider provides information, by identifying information for specifying the rectangle (e.g., northeast end and southwest end) with the information accumulation means 22 beforehand.

In this embodiment, "Sato Shop" is selected as an information provider close to the position indicated by the position information transmitted from the car navigation system 1, and "all products are 20% off today" is found as position-related information to be provided. The position-related information thus found is transmitted from the information transmission/reception means 21 to the car navigation system 1 via the network 3.

The information acquisition means 18 of the car navigation system 1 waits for reception of the position-related information from the server 2 (S24). When it is determined that the information acquisition means 18 receives the position-related information (Yes at S25), the information provision means 19 displays the received information to the user (S26). Examples of methods for providing information include visually displaying the information on a screen and auditorily conveying the information to the user by sound.

Search for the position-related information can be performed with other methods. For example, in the case where the car navigation system 1 and the server 2 share a node ID system, node IDs may be previously associated with respective pieces of information shown in FIG. 7 and the car navigation system 1 may transmit the ID of a predicted node as position information so that information on an information provider associated with the transmitted node ID is selected as position-related information.

Alternatively, the car navigation system 1 may transmit not only position information but also route information (e.g., "N3→N4→N6→N7") so as to perform a search using a criterion such as whether or not the position information or node ID of the information provider exists on the extension of the route indicated by the route information as well as whether or not the node IDs coincide with each other.

As described above, in this embodiment, it is possible to predict a destination of a user's vehicle. Accordingly, the user can receive useful information regarding the destination before reaching the destination, without performing any special operation. Even if the user does not intend to drive toward the destination, the information provision can motivate the user to travel to the destination.

In this embodiment, the route of the user's vehicle is represented in the manner of transition among nodes corresponding intersections, landmarks, areas and the like. Accordingly, the destination of the user can be newly predicted every time the user passes through a node after departure. As a result, it is possible to predict a destination as quickly as possible in the middle of the route.

In this case, position information on the destination of the user is transmitted from the car navigation system 1 to the server 2. Alternatively, a table showing a relationship between position information and the names or IDs of nodes may be provided in the car navigation system 1 so that the names or IDs of nodes obtained from the predicted position information by referring to the table is transmitted to the server 2 so as to acquire latest information.

Alternatively, a table showing a relationship between position information and URL addresses of web sites which provides information related to the position information as shown in FIG. 8 may be stored in the car navigation system 1 or the server 2 so that when position information is determined, information is acquired from a web site having a URL address corresponding to the position information by referring to the table.

In this embodiment, position information regarding nodes is stored together with date and time information. Alternatively, the position information detection means 11 may detect position information regularly to store the position information together with date and time information, irrespective of whether or not the detected information corresponds to a node, or may not store date and time information.

In addition, in predicting a future destination, estimated travel time required to reach the destination may be taken into consideration. This is because even if a node through which the user is quite likely to pass is predicted, it is not always appropriate to provide information regarding the node in the case where the arrival at the node is six hours later or on the next day. That is to say, destinations to which estimated required travel time exceeds a given time period are preferably eliminated from being predicted destinations.

For example, suppose that the action prediction means 17 predicts two nodes, i.e., nodes N100 and N200, as destinations of the user. In this case, detected position information and the date and time of the detection are stored in pairs in the travel information history accumulated in the travel information history accumulation means 15. Accordingly, the travel time required to reach each of the nodes N100 and N200 from the current place can be predicted from the accumulated travel information history.

Suppose that the idea of a threshold value to the required time is introduced and a rule such as "nodes to which the required time exceeds three hours are eliminated from being predicted nodes" is applied. In addition, suppose that the required times to reach the nodes N100 and N200 are predicted to be two hours and six hours, respectively. Then, the node N200 to which the required time exceeds three hours is eliminated from being a predicted node. As a result, the action prediction means 17 selects only the node N100 as a destination of the user.

In this embodiment, commercial information is provided as information regarding predicted destinations. However, information to be provided is not limited to the commercial information and may be information such as traffic information indicating a traffic jam or information on traffic control by the police.

In this embodiment, a travel information history is accumulated in predicting a destination. However, the present invention is not limited to this specific embodiment. For example, after a certain amount of the travel information history has been accumulated, the destination may be predicted by referring to the accumulated travel information history, without further accumulation of the history.

(Method for Deciding Node)

In this embodiment, it is sufficient to decide a node by referring to the map data beforehand. Basically, places where the user's vehicle stops (e.g., a landmark or an area) and intersections are defined as nodes by referring to drive routes of the user's vehicle. In addition, nodes can be added or removed by using information on the drive routes of the user's vehicle.

Figure 9:
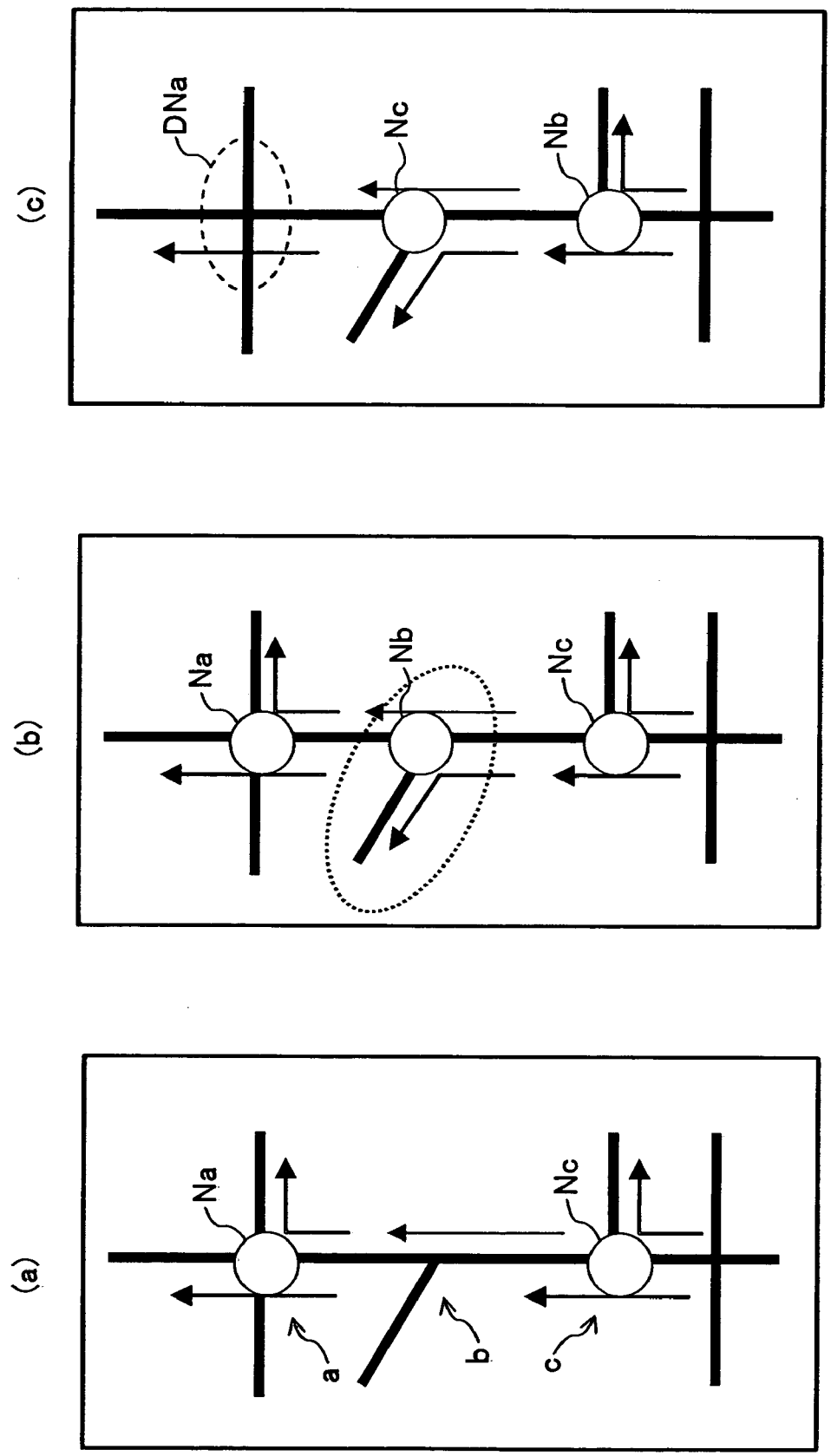
FIG. 9 shows diagrams respectively showing how to determine nodes.

For example, as shown in FIG. 9(*a*), some intersections through which the user's vehicle has run in two or more directions may be defined as nodes. Specifically, intersections a and c through which the user's vehicle has run in two directions are defined as nodes Na and Nc, whereas an intersection b through which the vehicle has run only in a direction is not defined as a node.

Thereafter, as shown in FIG. 9(*b*), when the user's vehicle runs through the intersection b in a different direction, the intersection b is added as a node Nb because the vehicle have run through the intersection b in two directions. Alternatively, as shown in FIG. 9(*c*), if the user's vehicle has run through the intersection a only in a direction in a past given time period, the node Na is removed. Such settings of nodes do not always require the map data but may be performed using only a drive history of the user's vehicle.

Embodiment 2

Figure 10:
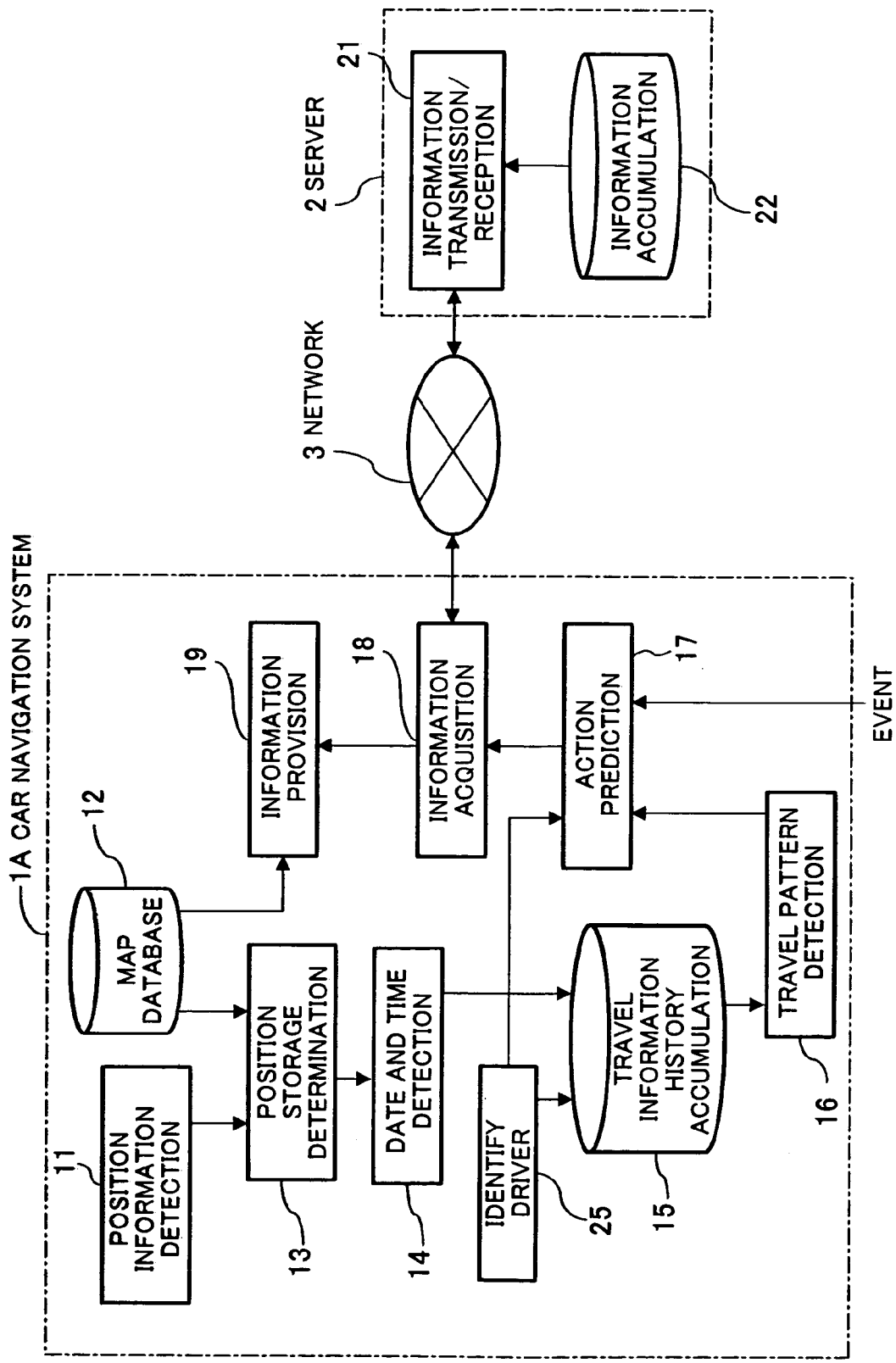
FIG. 10 is a diagram showing a configuration of the whole of a system according to a second embodiment of the present invention.

FIG. 10 is a diagram showing a configuration of the whole of a system according to a second embodiment of the present invention. In this embodiment, even an identical car navigation system predicts action in different manners depending on different drivers and then provides information. The system shown in FIG. 10 is different from that shown in FIG. 1 in that a car navigation system 1A is provided with a driver identification means 25.

The driver identification means 25 identifies a driver when the engine of a vehicle is started, for example. Examples of techniques for the identification include a technique of using keys or semiconductor cards individually provided to drivers and a technique of recognizing a telephone number by communicating with a cellular phone held by the driver. These techniques are not specifically limited. A result of identification by the driver identification means 25 is stored in the travel information history accumulation means 15 together with a node number obtained as, for example, a user ID in the same manner as in the first embodiment and the time at which the user passed through the node, as shown in FIG. 11.

In this manner, a travel information history for every user is stored, thus making it possible to calculate transition probabilities among nodes for every user. Accordingly, it is possible to provide predictions for respective drivers such as "the user with ID "2" drives toward the node N12 after traveling along a route including the nodes N6 and N8 in the morning" whereas "the user with ID "4" drives toward the node N28 after traveling along a route including the nodes N6 and N8" in the morning. With respect to such predictions, every user can be provided with suitable and detailed information.

In addition, occupants of a vehicle other than drivers may be identified. Specifically, if information for identifying not drivers but passengers is stored in the travel information history accumulation means 15, it is possible to perform predictions such as "if the driver drives alone, he/she will go to the node N5, whereas if the driver drives with his/her family, they will go to the node N16". Further, information on the driver and the information on the passenger may be stored together.

Examples of information which is preferably stored for every driver include information on the map database 12, for example, as well as travel information. In the first embodiment, users can register nodes to be stored in the map database 12. However, if users register a name such as "office" or "theater", the object indicated by the name might differ among the users. For example, the node of "office" indicates "ABC Fabrication Co. Ltd. when the driver is a father, while indicating "DEF Trading Co. Ltd." if the driver is an eldest son.

In view of this, the map database 12 may store nodes other than proper names for every driver and may change node information to be referred to, depending on an identification result obtained by the driver identification means 25. In addition, the node information for every driver may be stored separately from the map database 12. For example, a memory card on which the node information for every driver is recorded, for example, may be inserted in the car navigation system 1A so that reference is made to both of the map database 12 and the memory card. Alternatively, the node information may be present on the network.

Embodiment 3

Figure 12:
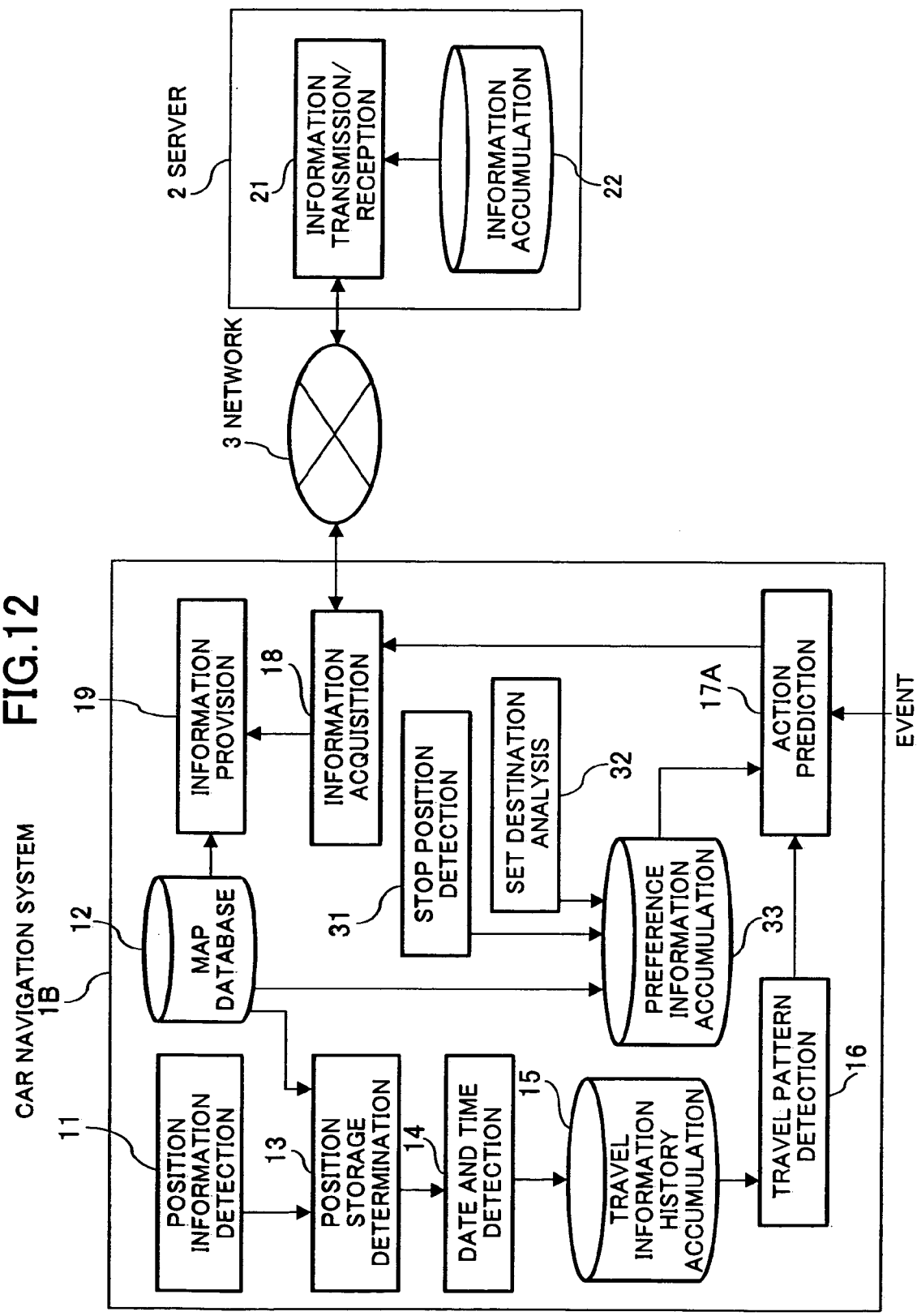
FIG. 12 is a diagram showing a configuration of the whole of a system according to a third embodiment of the present invention.

FIG. 12 is a diagram showing a configuration of the whole of a system according to a third embodiment of the present invention. In this embodiment, preference information regarding places which a user prefers is previously stored in a car navigation system to provide the user with information to which the preference information is added together with a predicted destination. In this case, places such as a place which the user has set in the car navigation system as a destination and a place where the vehicle stopped for a predetermined time period or longer with the engine thereof halted are defined as places which the user prefers.

The system shown in FIG. 12 is different from that shown in FIG. 1 in that a car navigation system 1B is provided with a stop position detection means 31, a set destination analysis means 32 and a preference information accumulation means 33. The stop position detection means 31 determines whether or not the vehicle has stopped for a predetermined time period or longer with the engine thereof halted and detects latitude and longitude information as position information on the user's vehicle that has stopped. The set destination analysis means 32 analyzes where a destination set in the car navigation system 1B by the user is located. The preference information accumulation means 33 refers to the map database 12 and stores information representing the frequency about the place detected by the stop position detection means 31 and the place analyzed by the set destination analysis means 32.

FIG. 13 shows an example of data stored in the preference information accumulation means 33. As shown in FIG. 13, each data item has attributes of position, name and frequency. In this case, when the user sets a destination, the map database 12 is searched with the position on the map, the telephone number, the name and like attributes used as keys. Therefore, almost all the places to be analyzed by the set destination analysis means 32 have names. On the other hand, position information detected by the stop position detection means 31 does not necessarily have a name registered for the search in the map database 12. Therefore, there exists data whose name has not been set yet such as in the lowermost line in the FIG. 13. Of course, if there is a node corresponding to position information, it is sufficient to describe the ID or name of the node.

The preference information is updated in the following manner. That is to say, when a place detected by the stop position detection means 31 or the set destination analysis means 32 has been already registered in data, the frequency about the place is increased by one, whereas when the place is unregistered, new data is added and the frequency is set at one.

Figure 14:
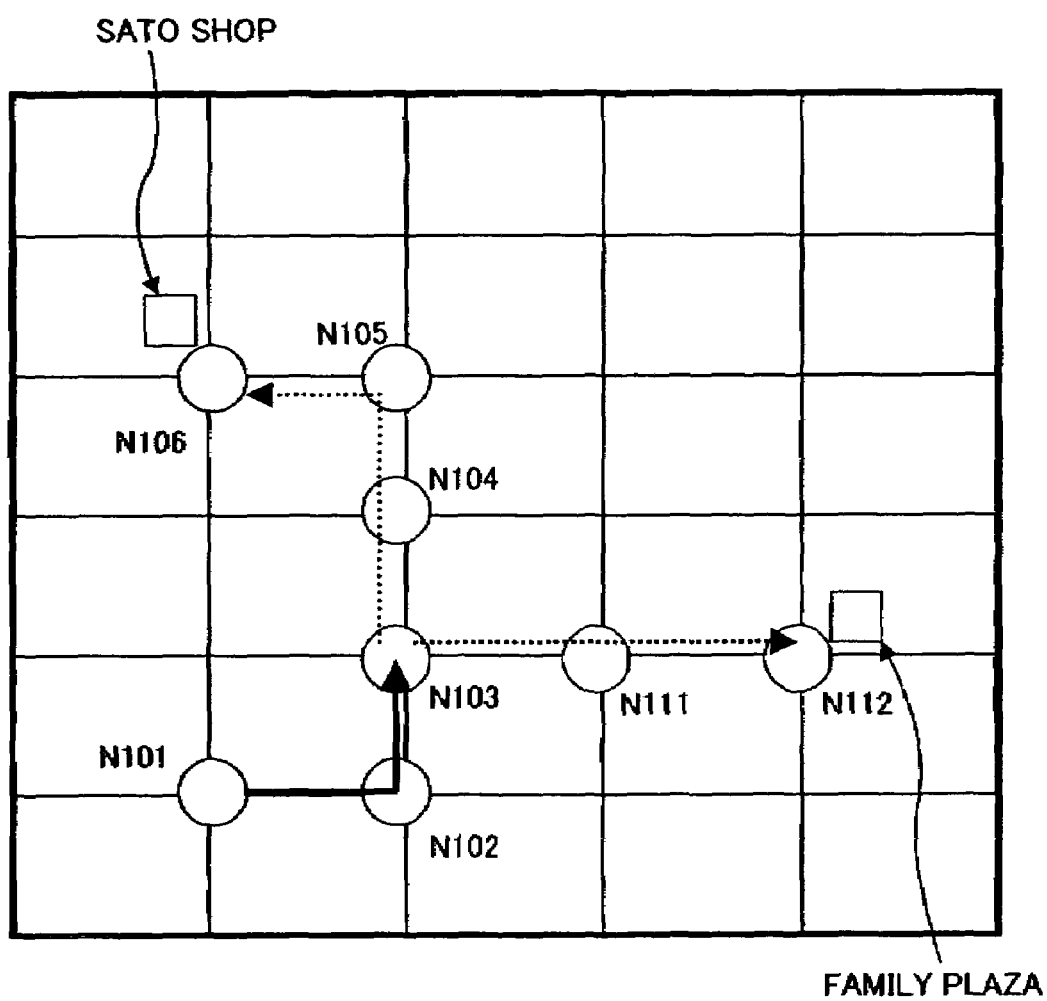
FIG. 14 is a diagram for use in describing action prediction in the third embodiment of the present invention.

It will be described how an action prediction means 17A of this embodiment operates with reference to FIG. 14.

Suppose that the user's vehicle is now at a node N103 by way of nodes N101 and N102. Then, a probability P(N106) that the user's vehicle will run toward a node N106 by way of nodes N104 and N105 and a probability P(112) that the vehicle will run toward a node N112 by way of a node N111 can be obtained by the method described in the first embodiment. Suppose that $P(N106)=0.6, P(N112)=0.4$ where a threshold value $\alpha=0.5$. Then, it is determined that the vehicle is likely to run toward the node N106 in the first embodiment.

In the third embodiment, the preference information accumulation means 33 is additionally used for reference. From the data shown in FIG. 13, it is found that the user fairly frequently visits Family Plaza located in the direction to the node N112. The proportion P(famipla) of frequency with which the vehicle stops at Family Plaza among all the places where the vehicle has ever stopped is 0.64(=64/(25+64+6+5). Then, a formula for calculating a value in consideration of both action prediction and preference information is defined as follows:

$\{P(N112)+P(\text{famipla})\}/2$

Then, the calculation with this formula obtains a value of 0.52 that exceeds the threshold value $\alpha$. Accordingly, the action prediction means 17A outputs two possible directions toward the respective nodes N106 and N112 as a prediction on future action of the user.

The information acquisition means 18 receives the node numbers N106 and N112 from the action prediction means 17A and transmits the received node numbers to the server 2 via the network 3. The subsequent operation of information provision is the same as in the first embodiment. The action prediction means 17A may output latitude and longitude information on the nodes N106 and N112 or the names of facilities and stores such as Sato Shop or Family Plaza, instead of the node numbers.

As described above, according to this embodiment, information is provided in consideration of preference information on the user as well as action prediction on the user. Accordingly, the user can acquire information regarding places which the user prefers other than a place for which the user is heading. As a result, the user have a wide range of choice in future action such as changing the schedule based on the acquired information, thus making it possible to propose new action to the user.

In this embodiment, the proportion of frequency regarding a place which the user prefers is obtained in consideration of frequencies regarding all the places accumulated in the preference information accumulation means 33. Instead, the proportion may be obtained in consideration of the frequency of only preferred places to which the user is expected to drive.

In this embodiment, action prediction is performed by the method described in the first embodiment. However, a function of considering preference information can be added as in this embodiment and is effective with any other method for action prediction.

Embodiment 4

Figure 15:
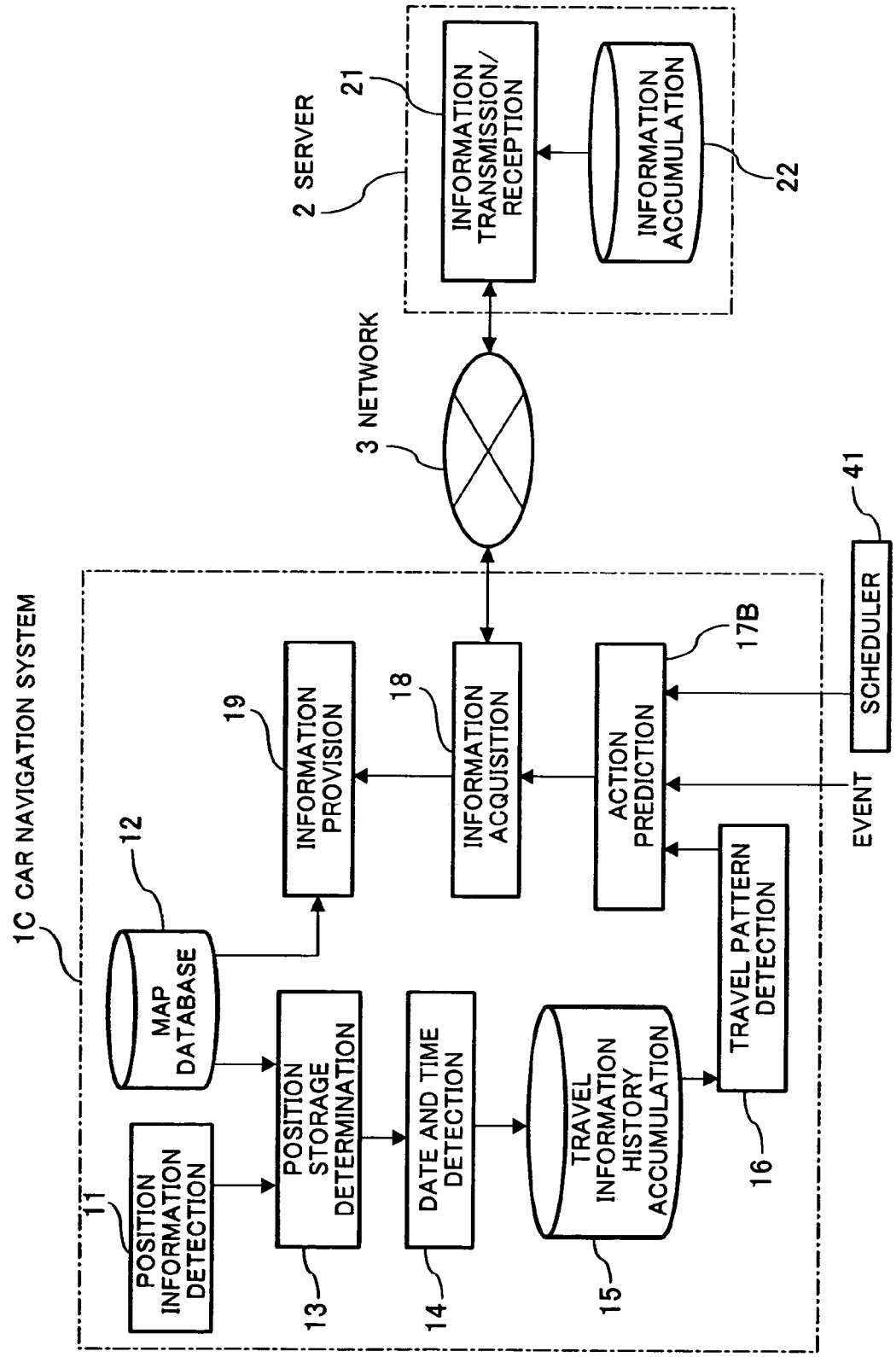
FIG. 15 is a diagram showing a configuration of the whole of a system according to a fourth embodiment of the present invention.

FIG. 15 is a diagram showing a configuration of the whole of a system according to a fourth embodiment of the present invention. In this embodiment, a schedule controlling function is utilized in addition to the action prediction so as to improve the accuracy in action prediction. The system shown in FIG. 15 is different from that shown in FIG. 1 in that an action prediction means 17B in a car navigation system 1C refers to a scheduler 41 provided with a function of controlling a schedule such as a PDA in predicting the action of a user. Examples of techniques for allowing the car navigation system 1C to refer to the scheduler 41 include a technique of communicating with equipment having a scheduling function such as a PDA or a cellular phone with or without a cable, a technique of using a memory card such as an SD card as a medium, and a technique of referring to schedule information present on the network. However, the present invention is not limited to these techniques.

FIG. 16 shows an example of schedule information controlled by the scheduler 41. The schedule in FIG. 16 shows that the user has a meeting in a home office from 10:00, moves to a research laboratory between 12:00 and 14:00, observes the laboratory from 14:00, and then goes home at 18:00.

Figure 17:
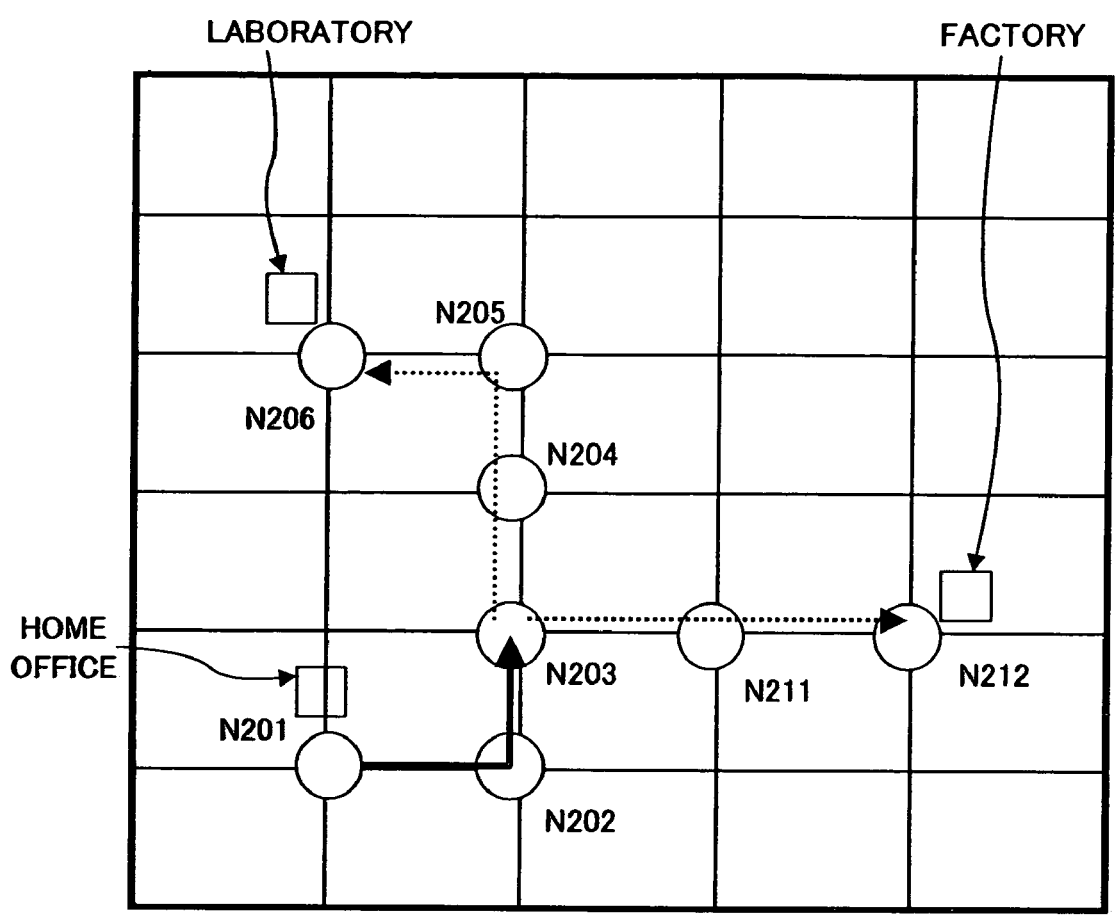
FIG. 17 is a diagram for use in describing action prediction in the fourth embodiment of the present invention.

A procedure of predicting an action by referring to the scheduler 41 will be described with reference to FIG. 17.

Suppose that the user leaves the home office around a node N201 and is now at a node N203 by way of a node N202 and the current time is 13:00. Then, the action prediction means 17 of the first embodiment calculates, referring to a travel information history, a probability P(N206) that the user will head for the node N206 at which the research laboratory is located and a probability P(N212) that the user will head for the node N212 at which a factory is located, shown by the following equations:

$P(N206)=0.4, P(N212)=0.4$

A threshold value indicating the certainty of prediction is 0.7. Any of the probabilities P(N206) and P(N212) does not exceed the threshold value and the direction in which the user is heading cannot be determined.

On the other hand, the action prediction means 17B of this embodiment acquires a schedule of the user from the scheduler 41 in addition to the travel information history, and refers to the acquired schedule and travel information history. It is described in the scheduler 41 that the user observes the research laboratory from 14:00. When it is determined that the research laboratory is located at the node N206 from the map database 12, the probability P(N206|schedule) that the user will head for the node N206 before 14:00 obtained from the schedule is defined, for example, as follows:

$P(N206|schedule)=0.5$

Then, the action prediction means 17B adds the predicted value P(N206)(=0.4) obtained from the travel information history to the predicted value P(N206|schedule) (=0.5), thereby obtaining 0.9 as a final predicted value. Since this obtained value exceeds the threshold value, i.e., 0.7, it is found that the user is likely to head for the node N206 as a future action. As a result, the action prediction means 17B predicts the direction toward the node N206 as a direction in which the user will travel and the information acquisition means 18 acquires information regarding the direction toward the node N206, thereby making it possible to provide the information to the user.

In this manner, according to this embodiment, the schedule of the user is grasped by using information equipment having a scheduling function such as a PDA in combination so that a destination is predicted in consideration of the schedule, thus allowing a prediction with higher accuracy. For example, in the case where it is difficult to determine the direction of traveling by using only the predicted value obtained from the travel information history, the direction may be predicted by adding the predicted value obtained from the schedule with reference to the schedule of the user.

The predicted value obtained from the schedule is fixed at a given value (0.5). Alternatively, this predicted value may be defined in various manners, e.g., may be obtained based on a past record concerning whether or not the user has acted as scheduled in the past, or may be set differently depending on places such that a value with respect to a place where the user acted as scheduled in the past is set relatively high.

If information to be acquired from the scheduler 41 includes not only names such as "research laboratory" but also information regarding the position thereof (e.g., latitude and longitude information or a node ID), it is possible to predict a place whose name is not included in the map database 12.

Figure 18:
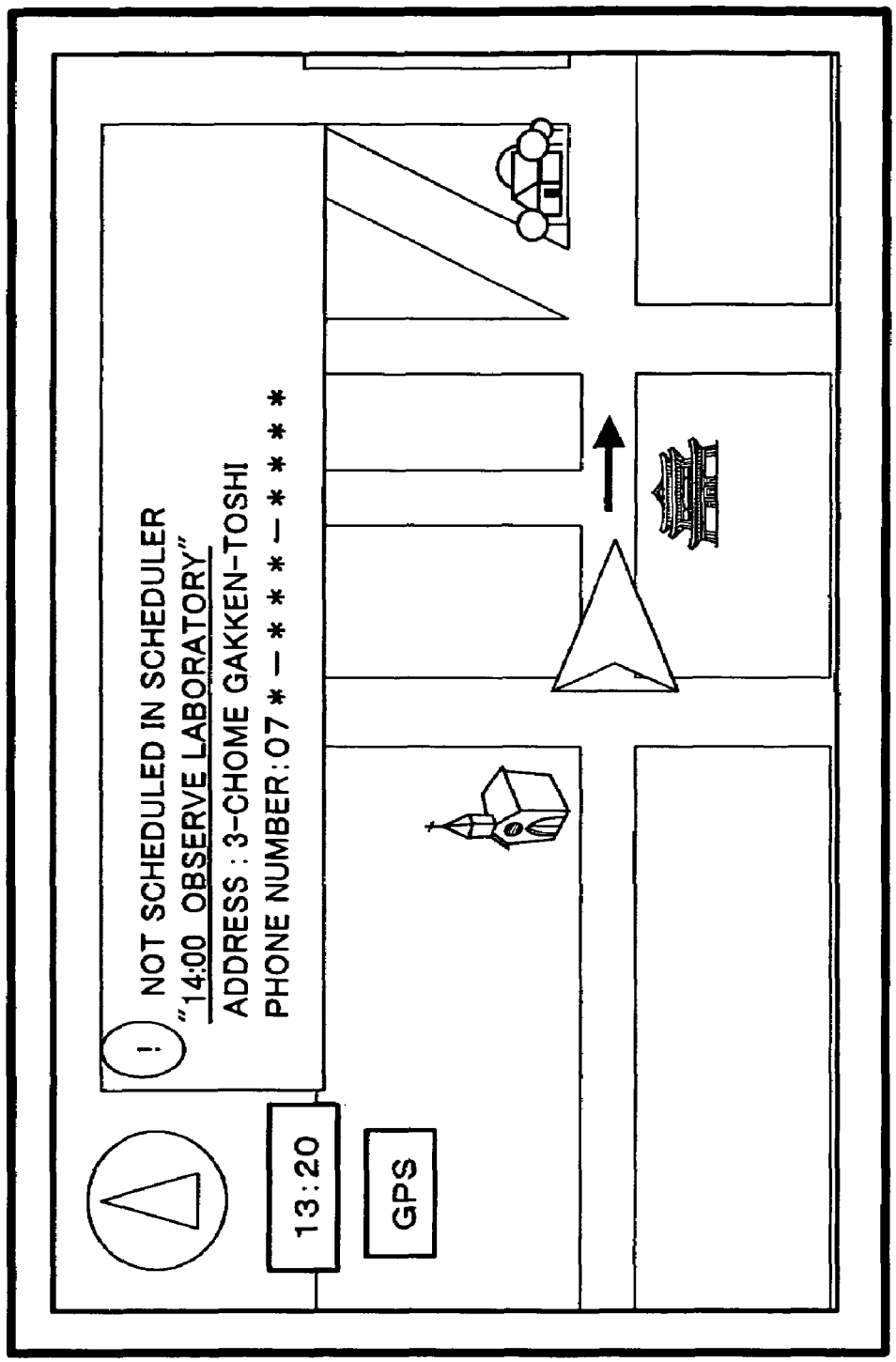
FIG. 18 shows an example of a message displayed when action prediction obtained from a history of travel information differs from that in a schedule.

In addition, in the case where the destination obtained from the travel information history deviates from that in the schedule acquired from the scheduler 41, a process for displaying a massage showing the deviation may be performed. FIG. 18 shows an example of a displaying screen of a car navigation system when such a massage is displayed. As shown in FIG. 18, if the action prediction and the schedule deviates from each other, a massage indicating that the destination for which the user is heading is different from that in the schedule is displayed to the user. In this case, the address and telephone number of the place for which the user is to be heading according to the schedule may be included in the massage. Alternatively, if the user's vehicle is equipped with a telephone function, a telephone call may be automatically made according to the request of the user. Further, a place where the user is to visit according to the schedule may be newly set as a destination in the car navigation system so as to notify the user of the route to the destination.

In this embodiment, the action prediction is performed by the method described in the first embodiment. However, the reference function of the scheduler can be added as in this embodiment and is effective with any other method.

Embodiment 5

Figure 19:
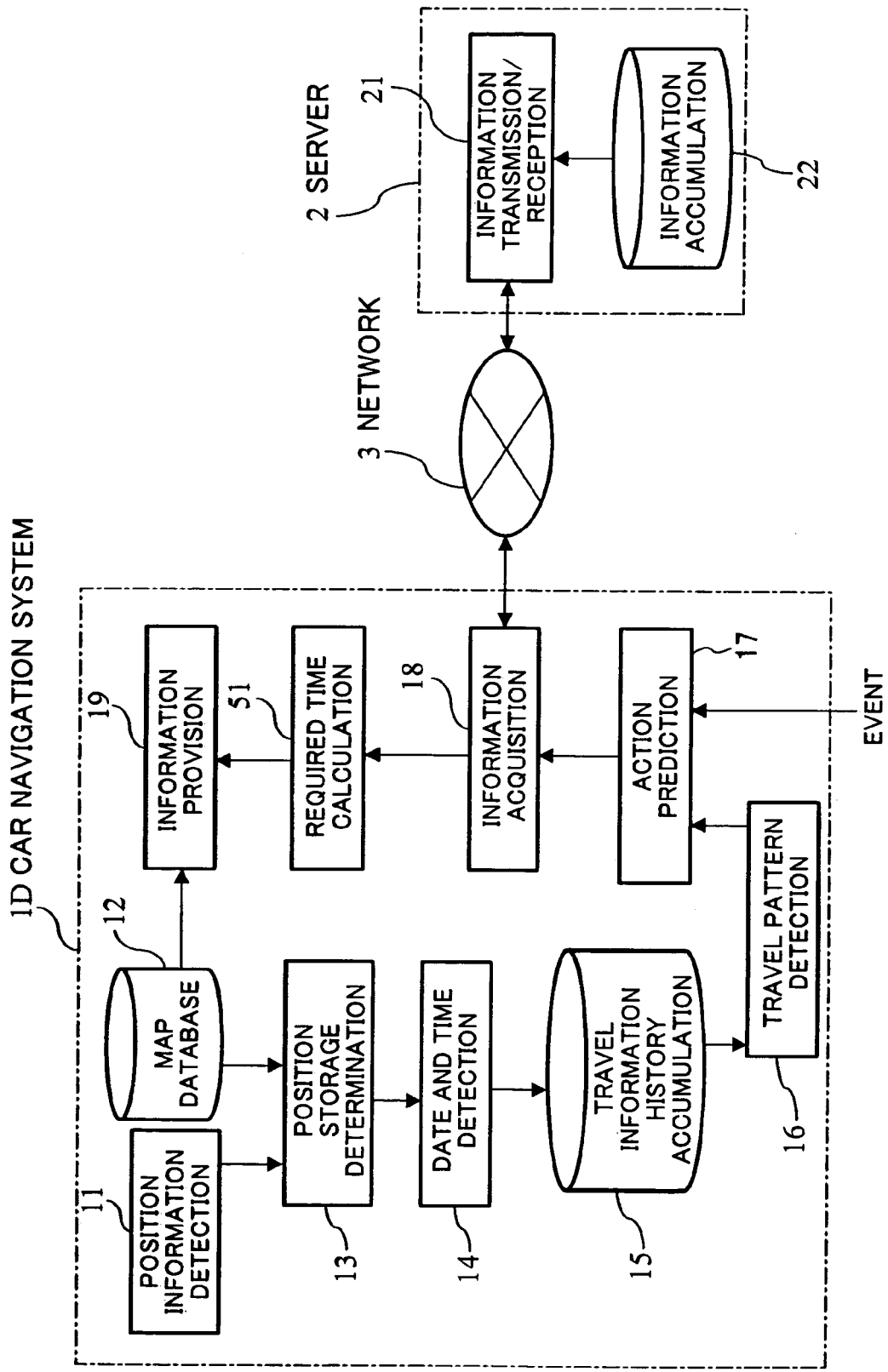
FIG. 19 is a diagram showing a configuration of the whole of a system according to a fifth embodiment of the present invention.

FIG. 19 is a diagram showing a configuration of the whole of a system according to a fifth embodiment of the present invention. In this embodiment, a destination of the user is predicted, and in addition, information such as estimated required time or estimated arrival time regarding the destination is presented. The system shown in FIG. 19 is different from that shown in FIG. 1 in that a required time calculation means 51 for calculating estimated time required to reach a predicted destination based on information acquired by the information acquisition means 18 via the network 13.

FIG. 20 shows an example of a travel information history accumulated in the travel information history accumulation means 15 in this embodiment. In the example shown in FIG. 20, dates, times of departure, places of departure, routes and destinations are accumulated as travel information. The places of departure are places where the engine was started, and the destinations are places where the engine was halted.

Examples of techniques for expressing places of departure and destinations include various techniques. For example, if the place where the engine was halted is a landmark or an area stored in the map database 12, it is possible to express the place by the name or the node ID. If there is neither a landmark nor an area corresponding to the place where the engine was halted, the place may be expressed by a name or a node ID of a landmark or area at a small distance (within a predetermined distance) from the place or of a representative (famous) landmark or area located near the place. Alternatively, the place may be represented by the name or node ID of a nearby intersection or the address of the neighborhood of the place.

With respect to a place where the engine is frequently halted, a message urging the user to register the name of the place is output at given timing. Further, the name corresponding to the place (e.g., "Ms. A's house") may be automatically registered by referring to an address book, for example, held by the user or existing on the network.

A travel pattern detection means 16 refers to a travel information history as shown in FIG. 20 to detect a travel pattern as shown in FIG. 21. Specifically, the past drive of the user as shown in FIG. 20 is classified according to groups such as day of the week of departure or time of departure. In each of the groups, a set of departure places, routes and destinations are expressed using the average required time and the frequency. For example, FIG. 21 shows that in the morning on weekdays, if the departure place is the user's house, the destinations of ABC Co. Ltd., PQR Clinic and XYZ Supermarket have frequencies of 70%, 25% and 5%, respectively.

Figure 22:
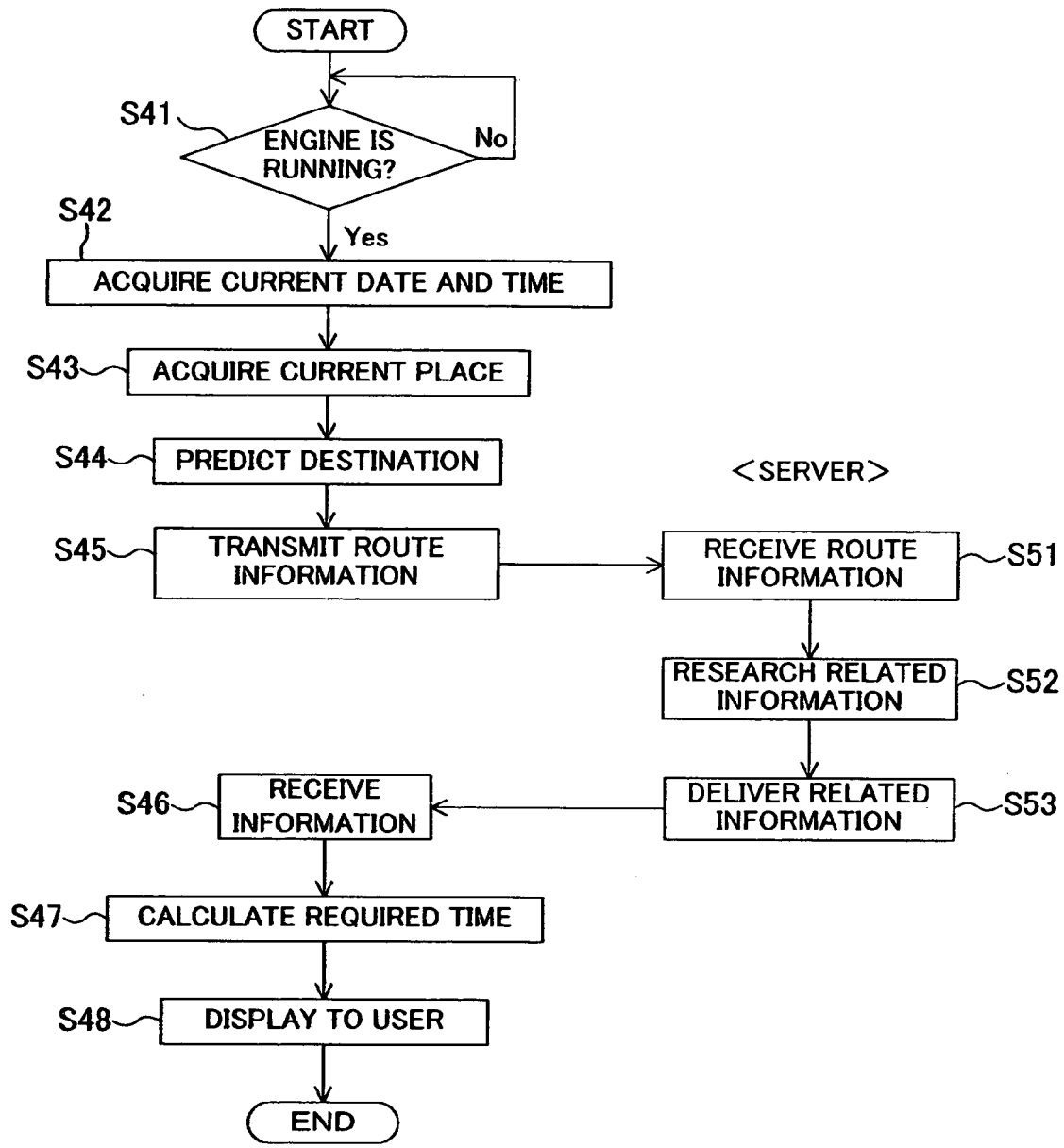
FIG. 22 is a flowchart showing the flow of a process of action prediction and information provision in the fifth embodiment of the present invention.

Now, action prediction according to this embodiment and the flow of a process for providing information to the user according to the action prediction will be described with reference to a flowchart shown in FIG. 22.

When detecting, for example, the start of the engine as a given event (S41), the action prediction means 17 acquires current date and time and information on the current position (S42 and S43). The information on the current position can be acquired by utilizing the position information detection means 11. Alternatively, a place where the engine was halted in the previous drive may be obtained by referring to the travel information history accumulation means 15 and defined as the current position. In this manner, information on the current position can be obtained quickly.

Suppose that the current date and time is 9:10 on a weekday and the current position is the user's house. Then, the destination of the user is predicted by referring to information as shown in FIG. 21 and detected by the travel pattern detection means 16. (S44). In FIG. 21, in the case where the user left the user's house as a place of departure between 8:00 and 11:00 on a weekday, the destinations are ABC Co. Ltd., PQR Clinic and XYZ Supermarket at frequencies of 70%, 25% and 5%, respectively. If the idea of a threshold value for showing the certainty of prediction as described in the first embodiment is introduced and destinations with frequencies of 20% or higher are defined as possible destinations, ABC Co. Ltd. and PQR Clinic are predicted. When the destination is predicted by the action prediction means 17, the information acquisition means 18 transmits, to the server 2, information on routes to the respective predicted destinations (S45).

Upon receiving the route information from a car navigation system 1D (S51), the server 2 searches traffic information accumulated in the information accumulation means 22 to find information concerning the route received (S52) and transmits the traffic information found to the car navigation system 1D (S53).

In the car navigation system 1D, when the information acquisition means 18 receives the traffic information (S46), the required time calculation means 51 calculates estimated travel time required to reach each of the possible destinations by referring to the received traffic information and the time periods required to reach the destinations shown in FIG. 20 (S47). For example, estimated required time is calculated with current traffic information taken into consideration as follows: "it takes 60 minutes from the user's house to ABC Co. Ltd. normally but 80 minutes in consideration of traffic information" or "it takes 20 minutes from the user's house to PQR Clinic without any traffic jam". Since the current time is 9:10, it is calculated that the estimated arrival time at ABC Co. Ltd. is 10:30 and the estimated arrival time at PQR Clinic is 9:30.

When the required time calculation means 51 calculates the estimated times of arrival to the respective possible destinations, the information provision means 19 provides the user with the calculated information (S48). FIG. 23 shows an example of information presented on a screen of the car navigation system 1D. In FIG. 23, in addition to the estimated times of arrival, related traffic information is provided to the user. Instead of the estimated times of arrival, information regarding estimated required time may be provided.

In this embodiment, the estimated required time to reach each of the predicted destinations is calculated based on the average required time in the past drive of the user and the current traffic information. Alternatively, the distance from the current position to the destination may be measured by referring to the map database 12 to roughly estimate the required time utilizing average speed of the vehicle.

MODIFIED EXAMPLE

In addition, in the case where comparison is made between estimated required time or estimated arrival time and the schedule of the user to determine the presence or absence of idle time or the presence or absence of possibility of being late, to find the presence of idle time or the possibility of being late, it is possible to provide new information.

Figure 24:
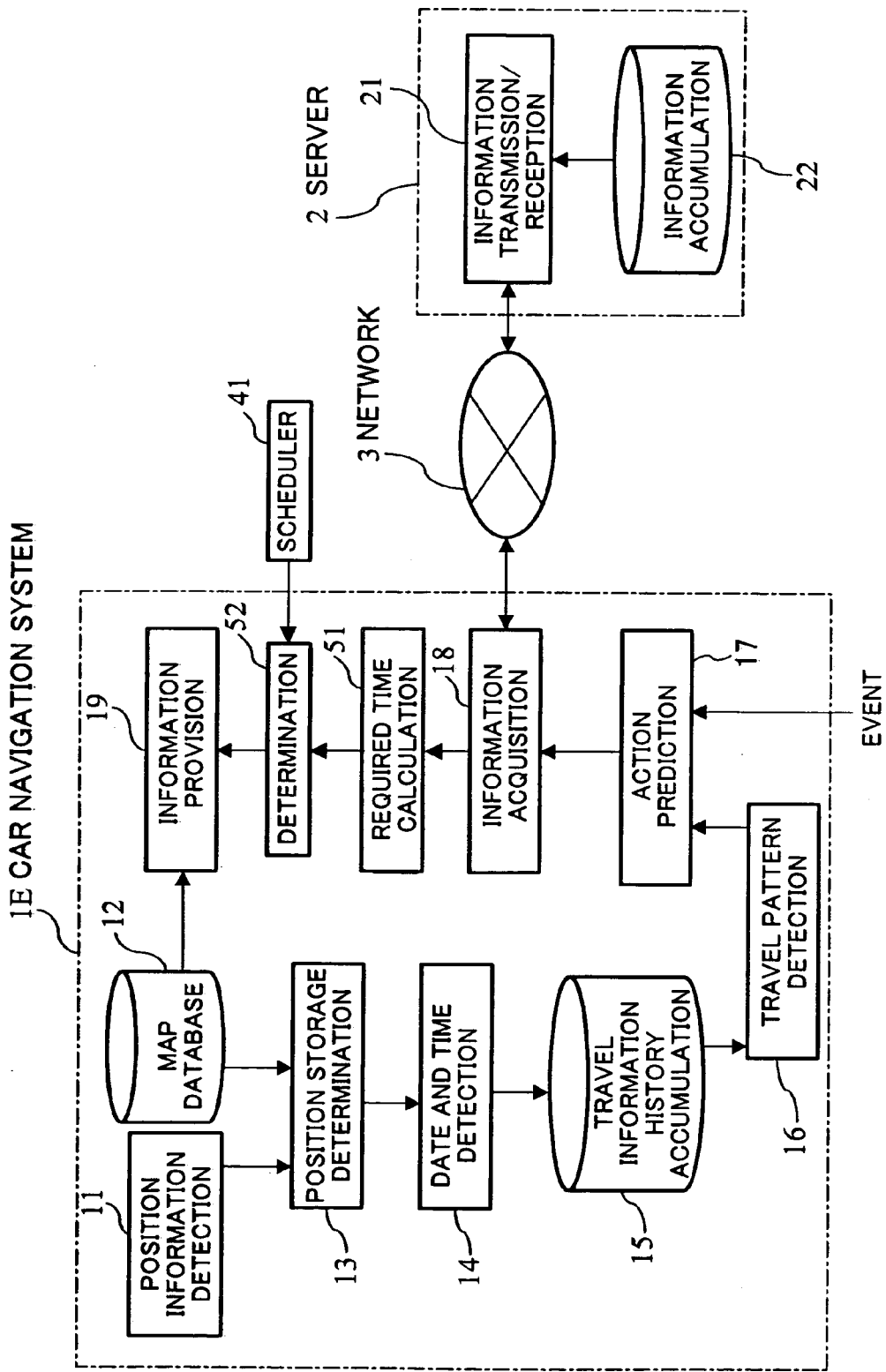
FIG. 24 is a diagram showing a configuration of the whole of a system according to a modified example of the fifth embodiment of the present invention.

FIG. 24 is a diagram showing a configuration of the whole of a system according to a modified example of this embodiment. As compared to the system shown in FIG. 19, a determination means 52 for comparing a calculation result obtained by the required time calculation means 51 with the user's schedule obtained from the scheduler 41 is provided. The determination means 52 compares the estimated required time or estimated arrival time that has been calculated with the user's schedule, thereby detecting the presence of idle time or the possibility of being late.

Figure 25:
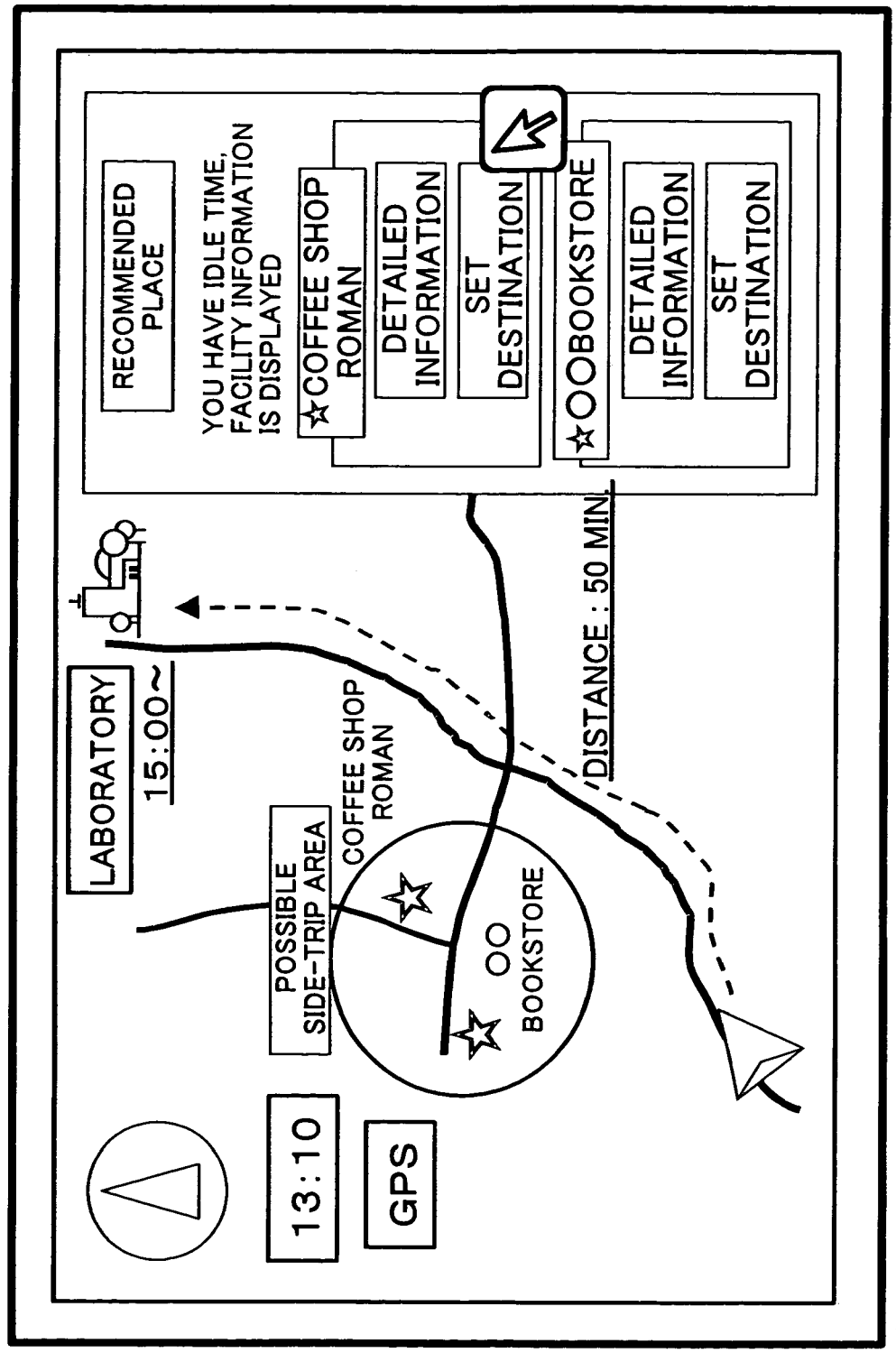
FIG. 25 shows an example of information to be provided to a user in the presence of idle time.

For example, provided that the user is scheduled to go to a research laboratory at 15:00 according to the scheduler 41. If the current time is 13:10 and the estimated time required to reach the research laboratory from the current position is 50 minutes, it is found that there is idle time of about one hour. If the determination means 52 detects the presence of the idle time of about one hour, the information provision means 19 provides the user with information for suggesting how to spend the idle time. For example, as shown in FIG. 25, the user is provided with information regarding recommended places (e.g., coffee shops and bookstores) which is located near the route to the research laboratory and which the user can visit within the idle time of about one hour.

Figure 26:
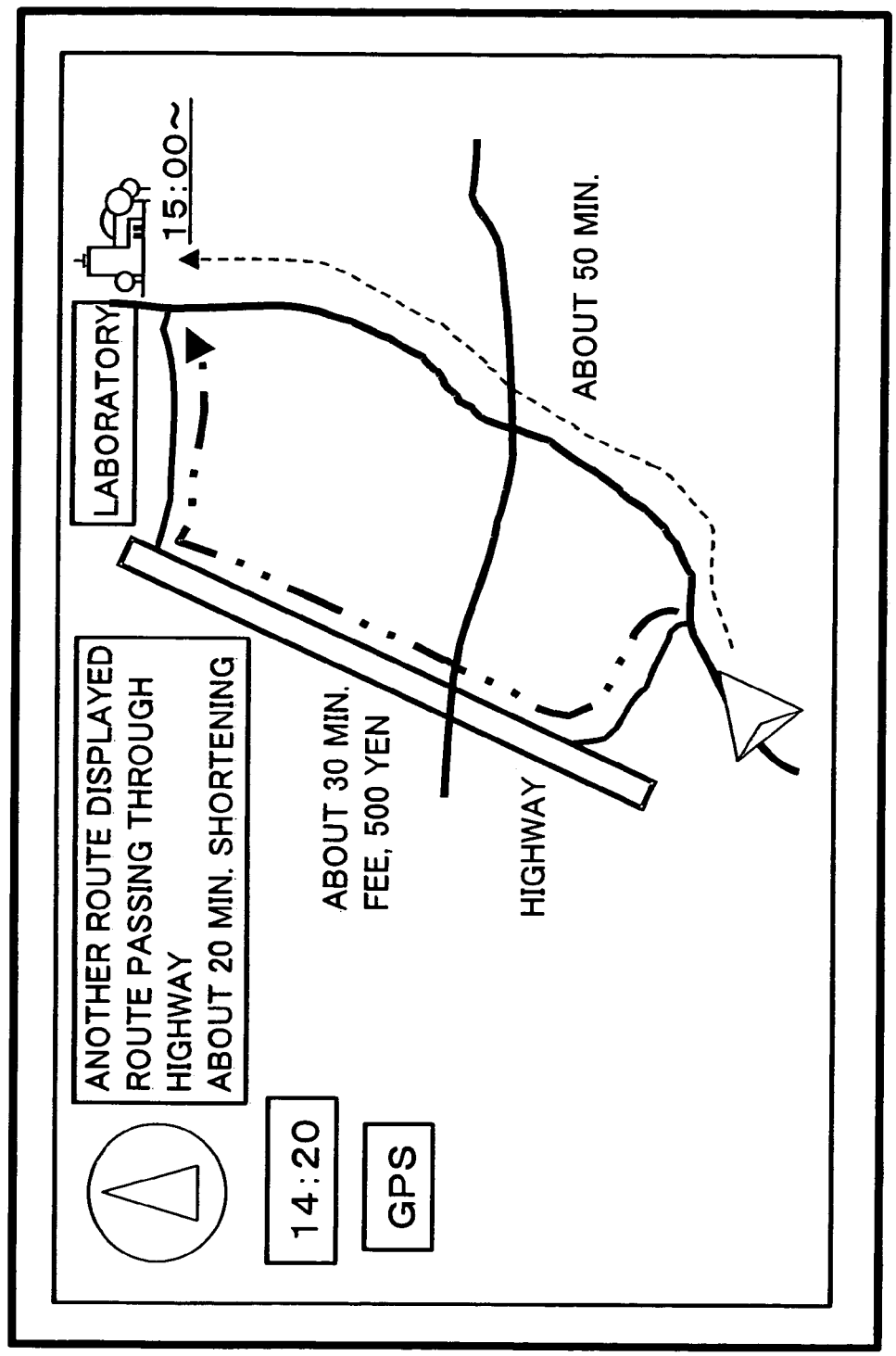
FIG. 26 shows an example of information to be provided to a user in the presence of possibility of being late.

Provided that the user is scheduled to go to the research laboratory at 15:00 according to the scheduler 41, the current time is 14:20 and the estimated travel time required to reach the research laboratory from the current position is 50 minutes, it is found that there is a possibility that the user will be slightly behind time. If the determination means 52 detects the possibility of being late, the information provision means 19 provides the user with information on another route with which the required time to reach the destination can be shortened. For example, in an example shown in FIG. 26, the user is recommended to use a highway running in parallel with the route to the research laboratory.

Embodiment 6

Figure 27:
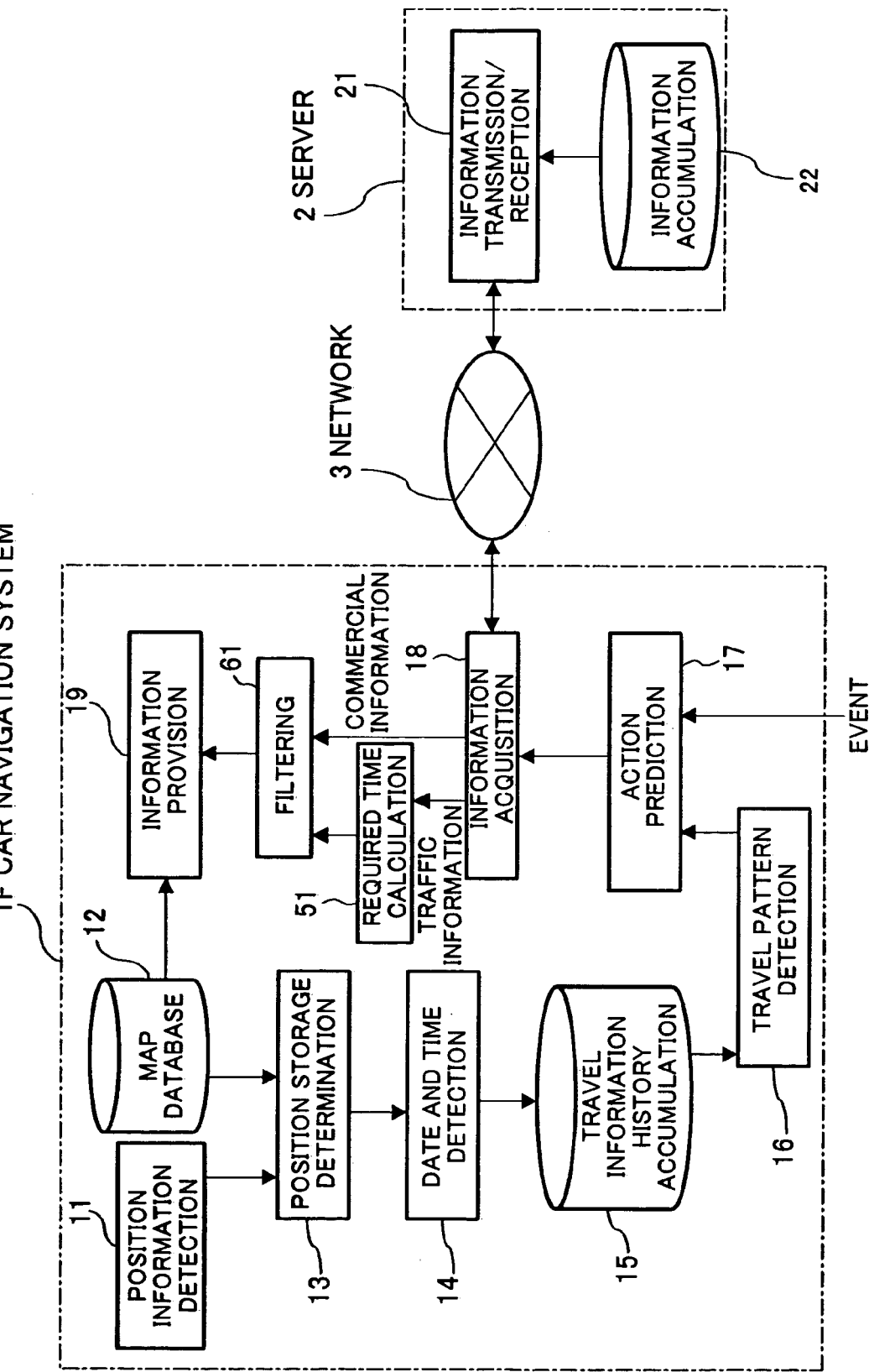
FIG. 27 is a diagram showing a configuration of the whole of a system according to a sixth embodiment of the present invention.

FIG. 27 is a diagram showing a configuration of the whole of a system according to a sixth embodiment of the present invention. The system shown in FIG. 27 is different from that shown in FIG. 1 in that the required time calculation means 51 described in the fifth embodiment and a filtering means 61 for filtering acquired commercial information by referring to estimated required time or estimated arrival time obtained by the required time calculation means 51 are provided.

Suppose that the action prediction means 17 predicts the nodes A and B as destinations of the user's vehicle. Then, the information acquisition means 18 acquires traffic information on the routes to the nodes A and B and commercial information related to the nodes A and B from the server 2 via the network 3.

FIG. 28 shows an example of commercial information acquired. As shown in FIG. 28, souvenirs are presented during the period from 9:00 on June 1 to 15:00 on June 2 at Children Plaza at the node A and female drivers receive a gas discount at GS Umeda at the node B. In this case, it is assumed that the required time calculation means 51 predicts that the arrival time at the node A is 15:20 on June 2 and the arrival time at the node B is 16:00 on June 2.

The filtering means 61 determines whether or not the predicted arrival times are included in an effective period of the commercial information and outputs only pieces of the information included therein. In this case, the estimated arrival time at Children Plaza at the node A, which is 15:20 on June 2, is after the effective period. Accordingly, the information on Children Plaza is eliminated from being information to be provided. On the other hand, the estimated arrival time at GS Umeda at the node B, which is 16:00 on June 2, is within the effective period. Accordingly, information on GS Umeda is determined to be useful to the user and thus is output to the information provision means 19.

Alternatively, instead of being eliminated, commercial information for which the estimated arrival time is after the effective period may be presented with a message notifying the user of high possibility of not being in time. Alternatively, the possibility of being in time may be displayed as a numerical value to call attention of the user. Further, the estimated arrival time may be repeatedly updated in accordance with a travel status of the user's vehicle and a traffic jam status so that value indicating the possibility of being in time is changed from moment to moment in accordance with updating of the estimated arrival time.

Furthermore, the commercial information may be filtered in the server 2.

Embodiment 7

Figure 29:
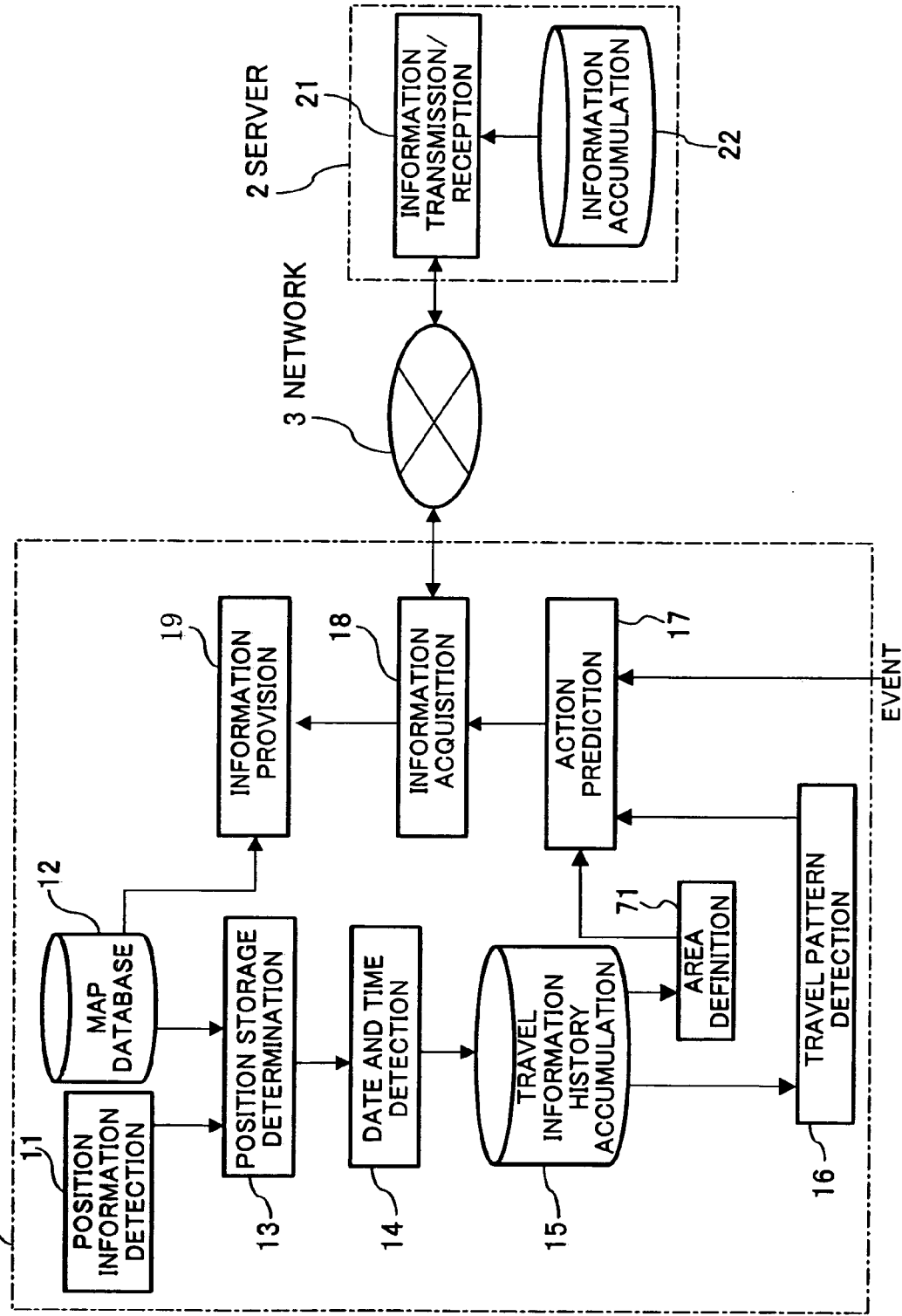
FIG. 29 is a diagram showing a configuration of the whole of a system according to a seventh embodiment of the present invention.

FIG. 29 is a diagram showing a configuration of the whole of a system according to a seventh embodiment of the present invention. The system shown in FIG. 29 is different from that shown in FIG. 1 in that an area definition means 71 for defining "area" including a plurality of nodes using a travel history information is provided.

Figure 30:
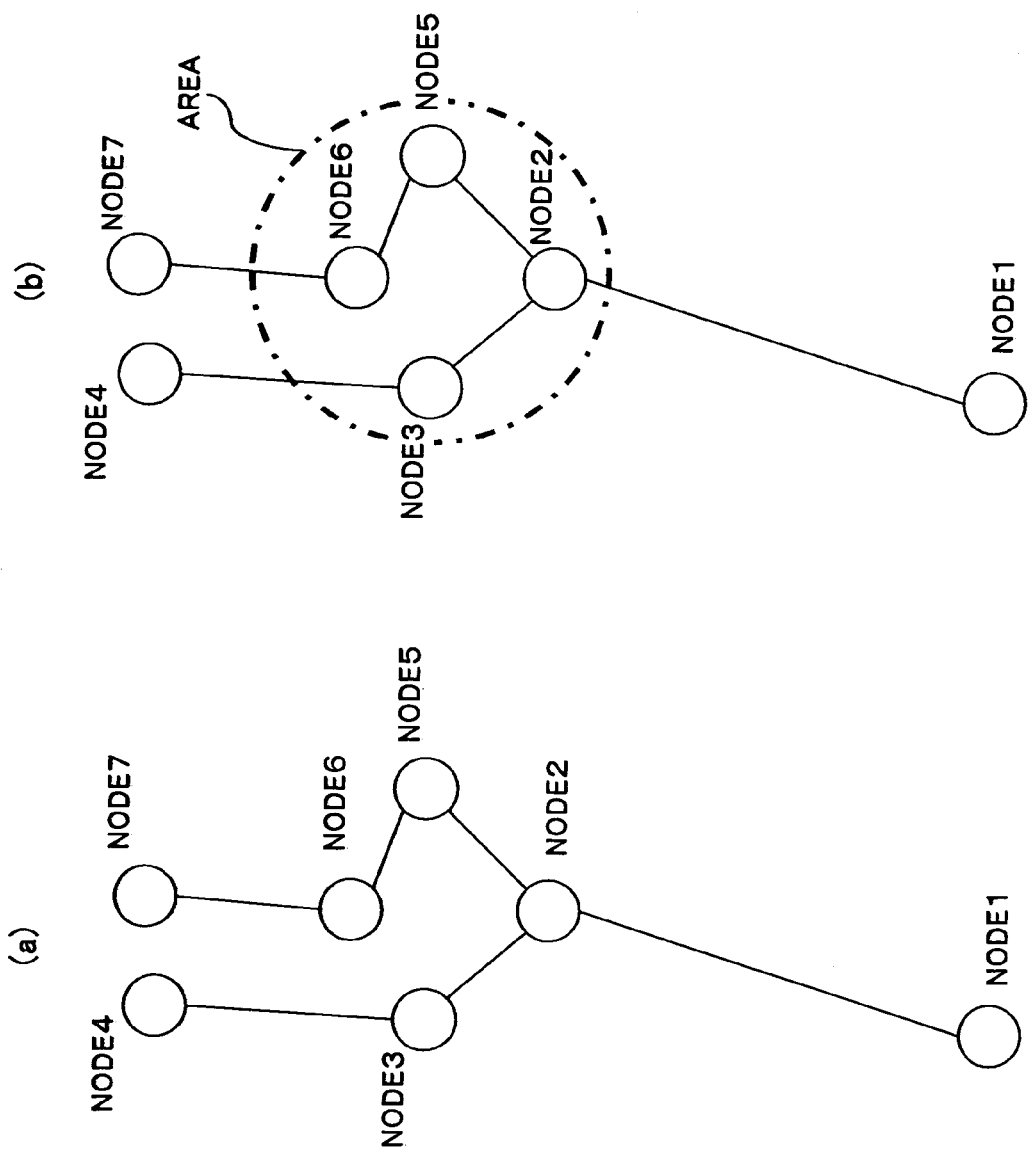
FIG. 30 is a diagram for describing definition of an area including nodes.

Suppose that there are nodes 1 through 7 as shown in FIG. 30($a$). In this case, the area definition means 71 refers to a travel information history accumulated in the travel information history accumulation means 15, and if there are a plurality of nodes which are located within a predetermined range of area and which the user has visited a given number of times or more, the area definition means 71 defines the nodes as an "area". In an example shown in FIG. 30($b$), the nodes 2, 3, 5 and 6 are brought together within an area.

When predicting that the destination of the user is the node 3, the action prediction means 17 refers to information on the area defined by the area definition means 71 to recognize that the nodes 2, 5 and 6 are included in the area also including the node 3. Then, the action prediction means 17 instructs the information acquisition means 18 to acquire not only information regarding the node 3 but also information regarding the nodes 2, 5 and 6. As a result, not only the information regarding the node 3 but also information regarding the nodes 2, 5 and 6 included in the same area are presented to the user.

The range of nodes to be included in an area may be changed depending on the distance from the user's house or the office where the user stays mainly. For example, the area may be enlarged, as the distance from the user's house increases. The range may be also changed depending on the transportation means of the user. For example, in the case where the transportation by car is a premise as in the case of car navigation systems, the range may be set wide, while in the case where the transportation on foot is a premise, the range may be set narrow.

The technique for defining an area is not limited to this embodiment. For example, the following technique may be used. As shown in FIG. 31, groups of nodes which can be defined as areas are previously defined corresponding to respective possible areas (e.g., an area 1 corresponding to "Umeda area" and an area 2 corresponding to "Namba area") Then, when one of possible areas satisfies a requirement that the number of user's visits exceeds a predetermined number with respect to a given number or more of nodes out of the corresponding groups of nodes, the possible area is defined as an area. Alternatively, nodes where the user visits on the same day or in the same time of day may be defined as an area.

In addition, the area definition as described above may be performed on areas already defined by considering the areas to be nodes.

Further, the area definition may be performed by previously setting a large area (e.g., "Higashi-Osaka area") so that, when the number of nodes included in the area increases, the area is divided. In the case of dividing an area to define new areas, the methods described above may be used.

In the foregoing embodiments, description is given on the assumption that a car navigation system is used as equipment for providing information to the user. However, in the present invention, information equipment is not limited to car navigation systems. Even an information terminal such as a cellular phone or a PDA that the user holds everyday may be used so long as sensing for position information can be performed. In such a case, the same advantages as that obtained in the embodiments can be achieved.

In the foregoing embodiments, the user is assumed to travel by car. However, even the cases where the user travels by means other than car, e.g., on foot or by train, the present invention is applicable so long as the user holds information equipment.

In the embodiments, examples in which the travel information history accumulation means 15, travel pattern detection means 16, and action prediction means 17 are provided inside information equipment such as a car navigation system. Alternatively, these means may be provided in an external server connected by a network. Specifically, a configuration in which information detected by the position information detection means 11 or the date and time detection means 14 is transmitted to the external server and accumulated therein so that when a given event happens, the server predicts a future action to send necessary information to the car navigation system may be used. Such a configuration is effective especially when the information equipment held by the user is a cellular phone or a PDA.

In the embodiments, a travel pattern is extracted from an accumulated travel information history. Alternatively, the travel pattern may be acquired from outside such as the network or may be set by the user himself/herself For example, when an information provider wants "to provide a user who is running along a route passing through node A→node B→node C with information on a shop C near a node T", the travel pattern detection means 16 is made to store this requirement. Then, when the user actually runs along the route passing through node A→node B→anode C, the node T is predicted as a direction in which the use will travel, so that the information acquisition means 18 requests information regarding the vicinity of the node T of the server 2.

In addition, to acquire information, a VICS or airwaves may be utilized instead of the network. In such a case, the information acquisition means 18 may extract only information regarding the destination predicted by the action prediction means 17 to provide the information to the user.

As described above, according to the present invention, a destination of the user is predicted based on the travel information history of the user and the route along which the user has traveled to the current time. Accordingly, even if the user does not perform any special operation, information on facilities or shops relating to the destination can be provided to the user appropriately.

The invention claimed is:

1. An information providing method for providing information to an occupant of a vehicle, the method comprising the steps of:

detecting position information on the vehicle with information equipment installed in the vehicle;

accumulating, as a travel information history, routes of the vehicle obtained from the detected position information;

predicting a destination of the vehicle by referring to a route along which the vehicle has traveled to the current time and to the accumulated travel information history, when detecting the occurrence of a given event; and providing information regarding the predicted destination to the occupant via the information equipment, wherein the travel information history is accumulated in the manner of transition among nodes, the method including the step of defining, as a node, an intersection which is located on the routes and through which the vehicle has passed in at least two directions.

2. An information providing method for providing information to an occupant of a vehicle, the method comprising the steps of:

detecting position information on the vehicle with information equipment installed in the vehicle;

accumulating, as a travel information history, routes of the vehicle obtained from the detected position information;

predicting a destination of the vehicle by referring to a route along which the vehicle has traveled to the current time and to the accumulated travel information history, when detecting the occurrence of a given event; and providing information regarding the predicted destination to the occupant via the information equipment, wherein in the predicting step, a destination to which estimated required travel time exceeds a predetermined value is eliminated from being a predicted destination.

* * * * *

UNITED STATES PATENT AND TRADEMARK OFFICE
CERTIFICATE OF CORRECTION

PATENT NO. : 7,130,743 B2 Page 1 of 1
APPLICATION NO. : 10/474459
DATED : October 31, 2006
INVENTOR(S) : Takahiro Kudo It is certified that error appears in the above-identified patent and that said Letters Patent is hereby corrected as shown below:

On the Title page and at the top of Column 1,

Change the title from "INFORMATION PROVIDING METHOD AND INFORMATION PROVIDING DEVICE" to -- METHOD FOR PROVIDING INFORMATION AND SYSTEM FOR PROVIDING INFORMATION --;

Item "(75) Inventors:", change "Takahiro Kudo, Katano (JP)" to -- Takahiro Kudo, Osaka (JP) --;

Item "(56) References Cited", under "FOREIGN PATENT DOCUMENTS", change "JP    10-180461    6/1998" to -- JP    10-160491    6/1998 --.

Signed and Sealed this

Seventeenth Day of April, 2007

JON W. DUDAS
*Director of the United States Patent and Trademark Office*